United States Patent
Konishi et al.

(10) Patent No.: US 11,199,993 B2
(45) Date of Patent: Dec. 14, 2021

(54) CONTROL SYSTEM, DEVELOPMENT ASSISTANCE DEVICE, AND DEVELOPMENT ASSISTANCE PROGRAM

(71) Applicant: OMRON Corporation, Kyoto (JP)

(72) Inventors: Fumiaki Konishi, Kusatsu (JP); Yuta Nagata, Kusatsu (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/643,839

(22) PCT Filed: Jan. 28, 2019

(86) PCT No.: PCT/JP2019/002735
§ 371 (c)(1),
(2) Date: Mar. 2, 2020

(87) PCT Pub. No.: WO2019/176336
PCT Pub. Date: Sep. 19, 2019

(65) Prior Publication Data
US 2021/0064275 A1    Mar. 4, 2021

(30) Foreign Application Priority Data
Mar. 12, 2018   (JP) .............................. JP2018-043845

(51) Int. Cl.
*G06F 3/00* (2006.01)
*G06F 3/06* (2006.01)
(52) U.S. Cl.
CPC .......... *G06F 3/0658* (2013.01); *G06F 3/0604* (2013.01); *G06F 3/067* (2013.01)
(58) Field of Classification Search
None
See application file for complete search history.

(56) References Cited

U.S. PATENT DOCUMENTS 7,603,266 B2 * 10/2009 Ramanathan ....... G06F 9/45537
                                                370/245
7,606,890 B1 * 10/2009 Baier ................. G05B 19/4185
                                                709/217
(Continued)

FOREIGN PATENT DOCUMENTS

CN       107332881 A     11/2017
JP     2008-276525 A     11/2008
(Continued)

OTHER PUBLICATIONS

An English translation of the International Search Report("ISR") of PCT/JP2019/002735 dated Mar. 12, 2019.
(Continued)

*Primary Examiner* — Craig S Goldschmidt
(74) *Attorney, Agent, or Firm* — Metrolex IP Law Group, PLLC

(57) ABSTRACT

There has been desired a technology for performing a publishing setting of a variable to an external device more easily. A development assistance device provides a development tool configured to develop a user program for controlling a controller. The user program includes at least one variable belonging to a predetermined namespace. The development tool is configured to accept, for the namespace, a publishing setting for causing the controller to determine whether to publish the variable belonging to the namespace to an external device that is communicatively connected to the controller. A communication interface transfers the user program and the publishing setting to the controller on the basis of acceptance of transfer operation of the user program by the development tool.

7 Claims, 17 Drawing Sheets

(56) References Cited

U.S. PATENT DOCUMENTS

2014/0325194 A1    10/2014    Brindle
2015/0025656 A1    1/2015    Ono et al.
2016/0092176 A1*    3/2016    Straub ................... G06F 3/0486
                                                                                                     717/107

FOREIGN PATENT DOCUMENTS

JP          2011-192085 A    9/2011
JP          2011-192088 A    9/2011

OTHER PUBLICATIONS

The Written Opinion("WO") of PCT/JP2019/002735 dated Mar. 12, 2019.
Extended European Search report (EESR) dated Oct. 22, 2021 in a counterpart European patent application.

* cited by examiner

FIG.7
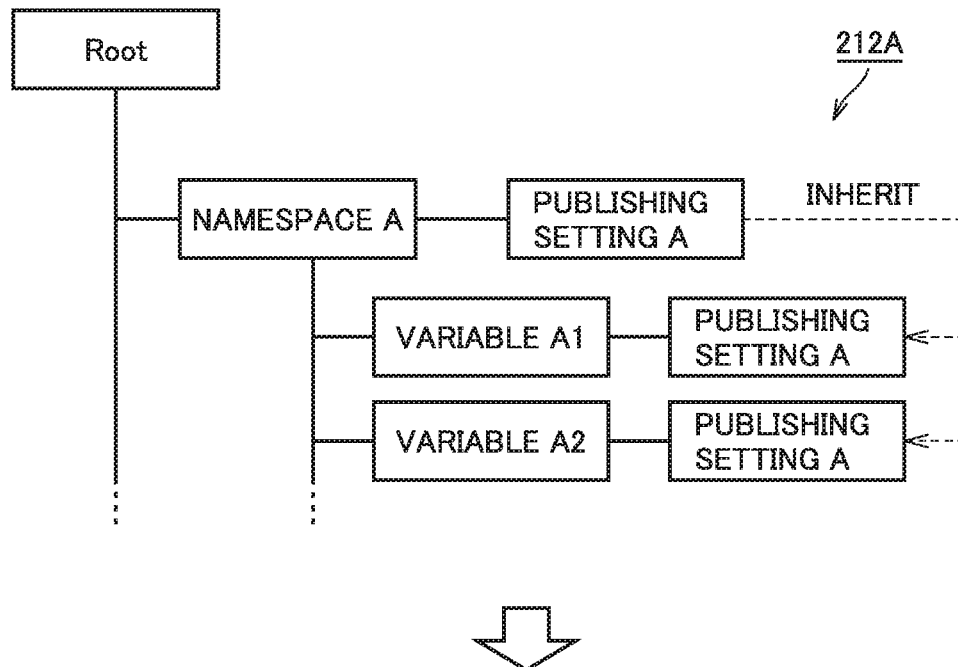
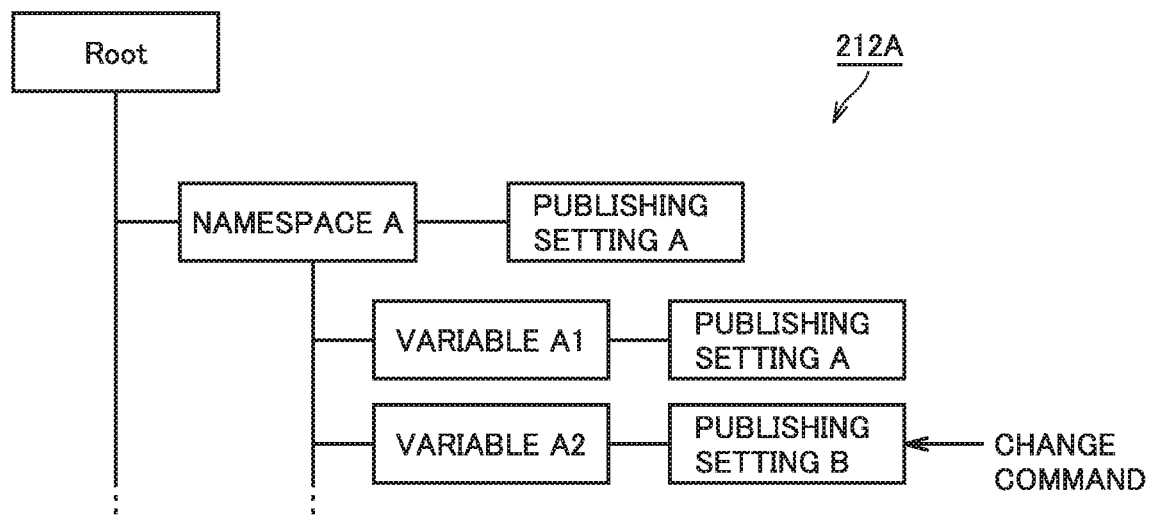

FIG.9

| NAMESPACE | PUBLISHING SETTING | | |
|---|---|---|---|
| | PUBLISHING RANGE | R/W | HOLD |
| NAME A | PUBLISH ▽ | R ▽ | ☑ |
| NAME B | NOT PUBLISH ▽ | — ▽ | ☐ |
| NAME C | EIP ▽ | R/W ▽ | ☑ |
| ⋮ | ⋮ | ⋮ | ⋮ |

SAVE  CANCEL

FIG.10
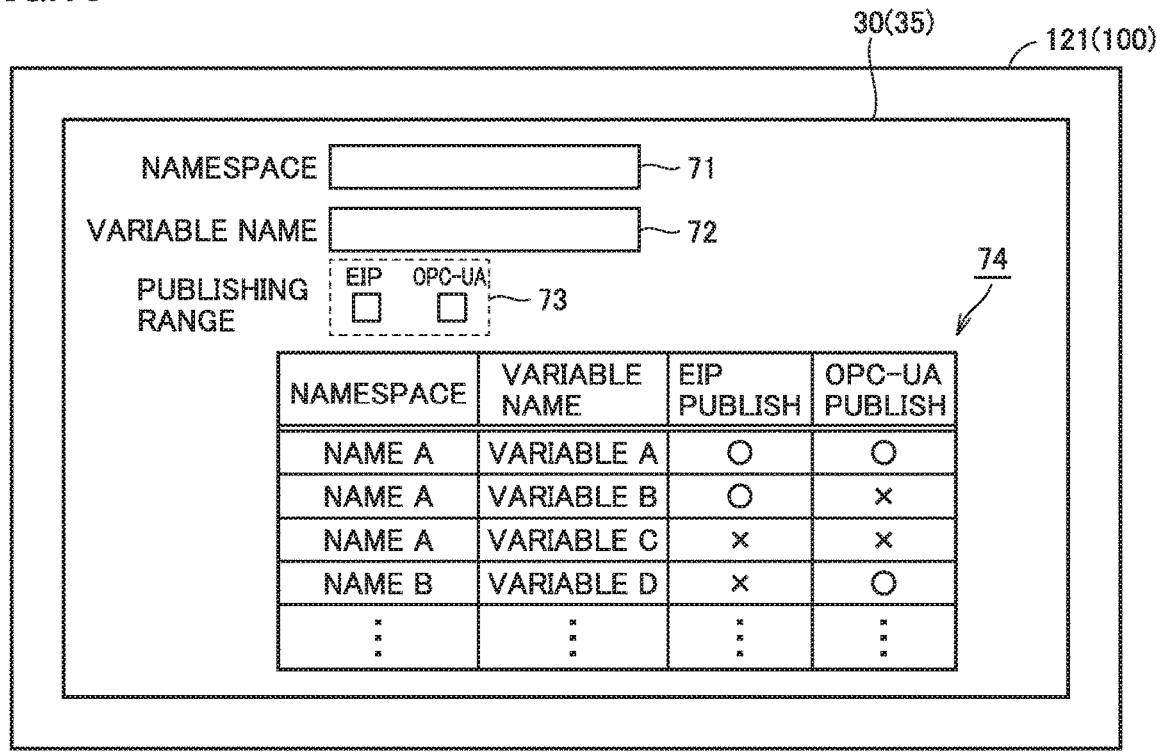
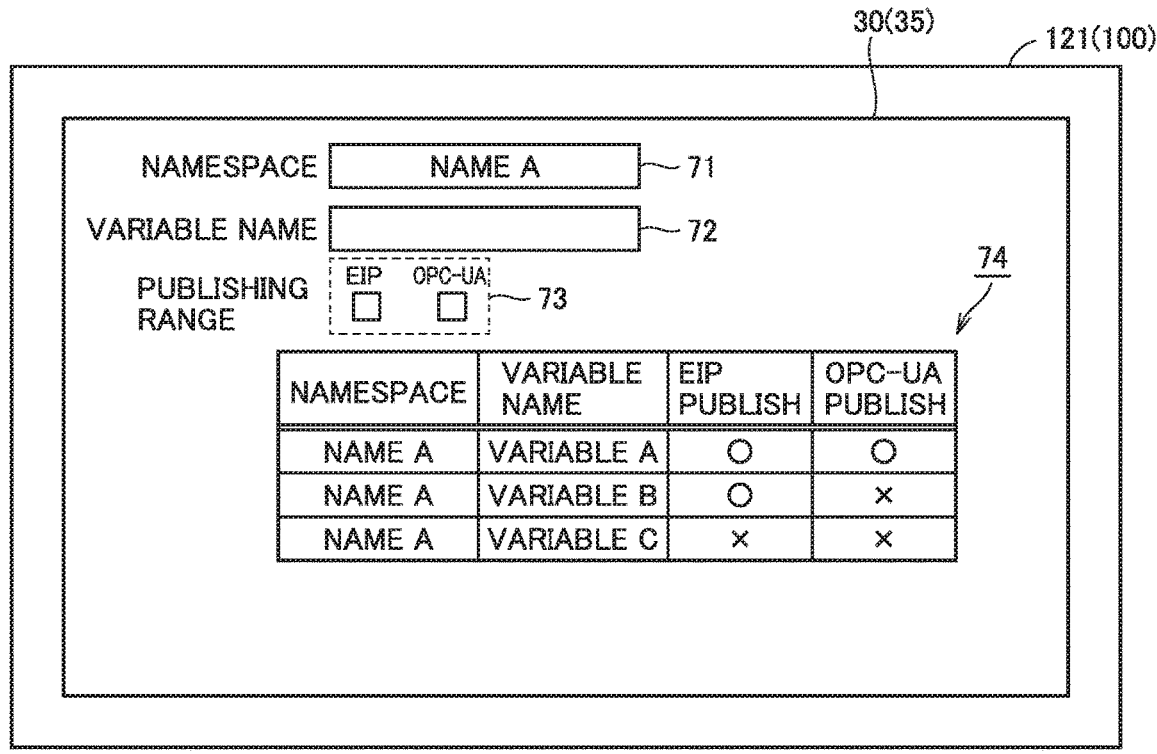

FIG.11
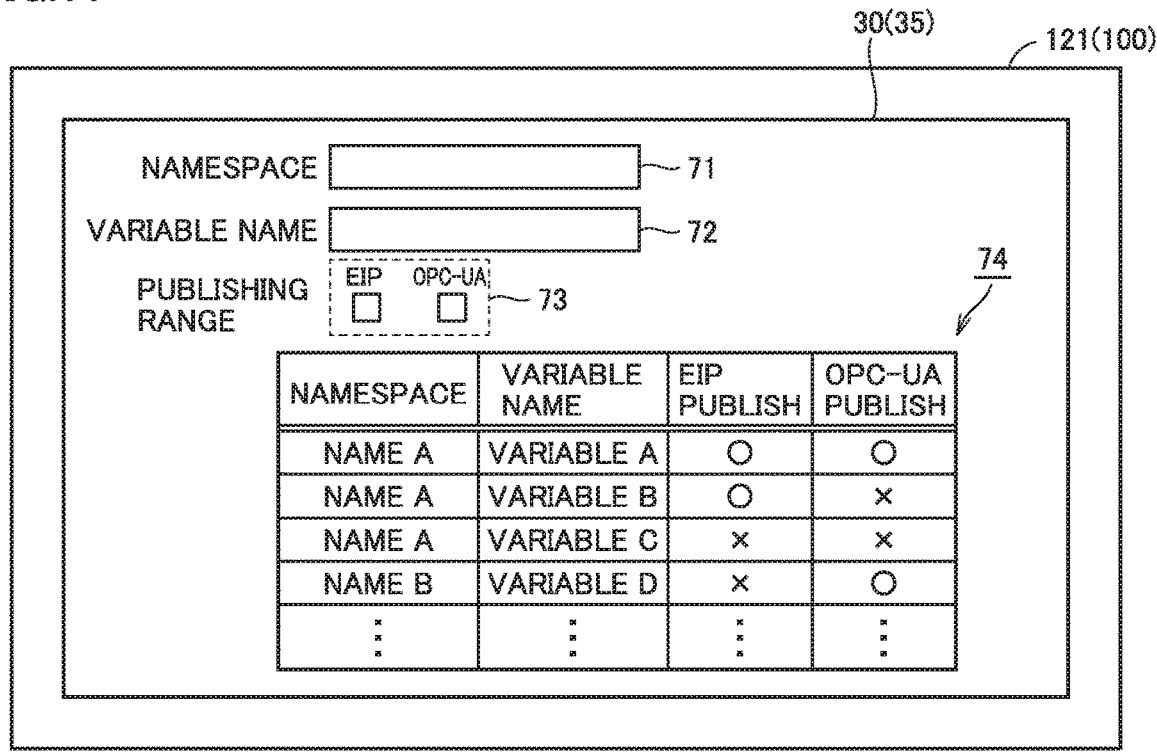
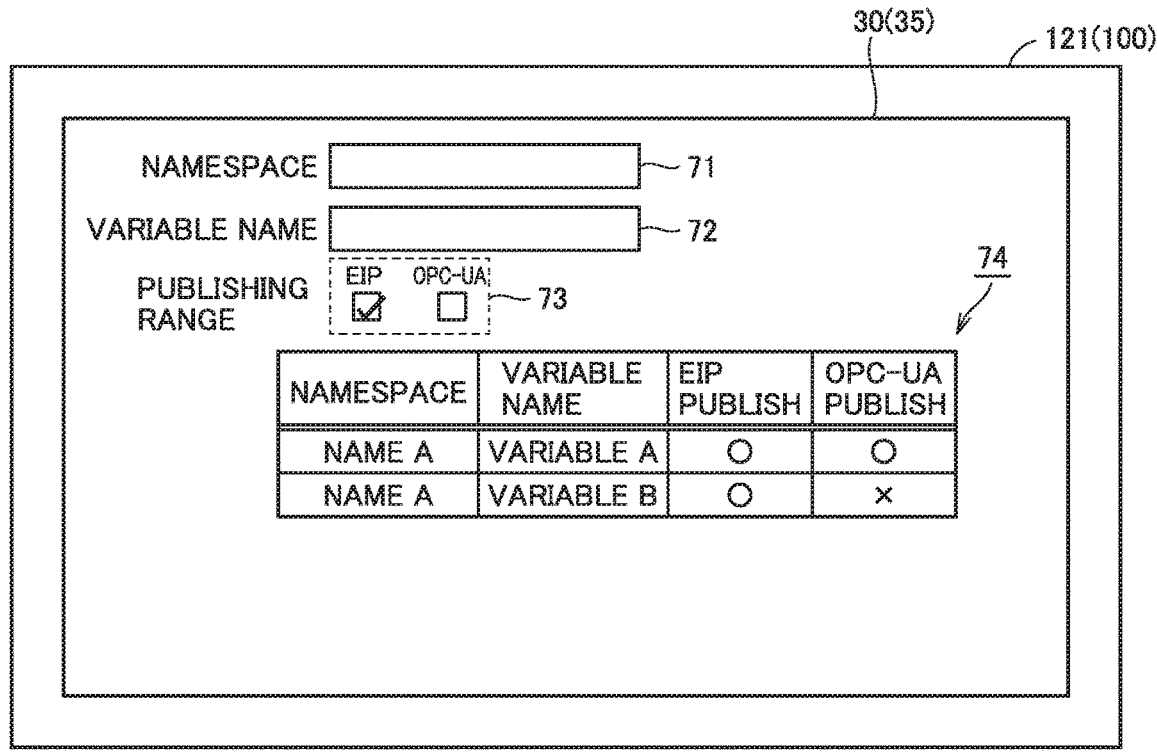

CONTROL SYSTEM, DEVELOPMENT ASSISTANCE DEVICE, AND DEVELOPMENT ASSISTANCE PROGRAM

TECHNICAL FIELD

The present disclosure relates to a technology for publishing variables managed in a controller to an external device.

BACKGROUND ART

In various production sites, factory automation (FA) systems for automating production processes have been widely used. The FA systems include various industrial drive devices. The industrial drive devices include, for example, a moving table for moving a workpiece, a conveyor for conveying the workpiece, and an arm robot for moving the workpiece to a predetermined destination. Those drive devices are controlled by an industrial controller such as a programmable logic controller (PLC) or a robot controller.

The controller controls various drive devices in accordance with a program designed in advance by a designer (hereinafter, also referred to as "user program"). There is an application for assisting in developing such a user program (hereinafter, also referred to as "development tool"). By writing a program on the development tool, the designer can develop an arbitrary user program suitable for a drive device to be controlled.

Regarding the development tool of user programs, Japanese Patent Laying-Open No. 2011-192088 (PTL 1) discloses a development assistance device for "allowing even a programmer who does not know or is unfamiliar to a concept of a namespace to easily create a user program by using "word" grouping by a namespace method, without being conscious of the concept of the namespace in particular".

CITATION LIST

Patent Literature

PTL 1: Japanese Patent Laying-Open No. 2011-192088

SUMMARY OF INVENTION

Technical Problem

In recent years, controllers connectable to a plurality of networks have been widely used. An external device communicatively connected to a controller can monitor a state of the controller and a state of a drive device to be controlled by accessing variables included in a user program during execution of the user program.

It is necessary to set in advance a variable to be published to the external device (hereinafter, also referred to as "public variable") and a variable not to be published to the external device (hereinafter, also referred to as "private variable") for security. However, because an enormous number of variables are included in the user program, it is extremely troublesome to specify each variable as a public variable or private variable.

The present disclosure has been made in order to solve the above problem, and an object in one aspect is to provide a technology for performing a publishing setting of a variable to an external device more easily.

Solution to Problem

In an example of the present disclosure, a control system includes a development assistance device and a controller configured to communicate with the development assistance device. A development tool configured to develop a user program for controlling the controller is installable in the development assistance device. At least one variable included in the user program belongs to a predetermined namespace. The development tool is configured to accept, for the namespace, a publishing setting for determining whether to publish the variable belonging to the namespace to an external device that is communicatively connected to the controller. The controller includes a program execution unit configured to control a drive device to be controlled in accordance with the user program received from the development assistance device, and update the variable belonging to the namespace in accordance with an execution result of the user program, and a publishing setting unit configured to publish the variable belonging to the namespace to the external device in a case where the publishing setting received from the development assistance device indicates "publish".

According to this disclosure, the publishing setting of the variable to the external device is performed for each namespace included in the user program, and whether to publish each variable is determined on the basis of the publishing setting set for the namespace. This eliminates the need for the designer to individually set each variable as a public variable. As a result, the publishing setting of the variable to the external device becomes easier.

In an example of the present disclosure, the publishing setting can be set for each variable belonging to the namespace. The publishing setting for the namespace is reflected as an initial value in the publishing setting for the variable.

According to this disclosure, the publishing setting set for the namespace is reflected as the initial value in the publishing setting of each variable, and thus the designer can save time and labor for performing the publishing setting of each variable. Further, the designer can individually change the publishing setting of each variable. As a result, the designer can not only reduce time for performing the publishing setting of each variable, but also flexibly set publish/not publish" of each variable in accordance with individual circumstances.

According to an example of the present disclosure, the publishing setting unit determines whether to publish the variable belonging to the namespace to the external device by prioritizing the publishing setting for the variable over the publishing setting for the namespace.

According to this disclosure, the publishing setting individually set for each variable is more likely to reflect intention of the designer than the publishing setting set for the namespace. Thus, the intention of the designer is reflected more reliably by prioritizing the publishing setting for the variable over the publishing setting for the namespace.

In an example of the present disclosure, the publishing setting further includes a communication setting indicating a communication protocol. In a case where the controller and the external device communicate with each other by using the communication protocol indicated by the communication setting, the publishing setting unit publishes the variable belonging to the namespace to the external device.

According to this disclosure, the controller can divide variables into public and private variables in accordance with the communication protocol.

According to an example of the present disclosure, the development assistance device further includes a volatile storage device and a nonvolatile storage device. The publishing setting includes a holding setting indicating whether to hold the variable belonging to the namespace. The publishing setting unit stores the variable belonging to the namespace in the nonvolatile storage device in a case where the holding setting indicates "hold", and stores the variable belonging to the namespace in the volatile storage device in a case where the holding setting indicates "not hold".

According to this disclosure, the controller can properly use the variable to be held in the volatile storage device and the variable to be held in the nonvolatile storage device in accordance with a usage mode.

In another example of the present disclosure, a development assistance device configured to communicate with a controller configured to control a drive device to be controlled in response to a control command specified in a user program includes: a communication interface configured to communicate with the controller; and a storage device configured to store a development program for providing a development tool configured to develop the user program. At least one variable included in the user program belongs to a predetermined namespace. The development tool is configured to accept, for the namespace, a publishing setting for causing the controller to determine whether to publish the variable belonging to the namespace to an external device that is communicatively connected to the controller. The communication interface transfers the user program and the publishing setting to the controller on the basis of acceptance of transfer operation of the user program by the development tool.

According to this disclosure, the publishing setting of the variable to the external device is performed for each namespace included in the user program, and whether to publish each variable is determined on the basis of the publishing setting set for the namespace. This eliminates the need for the designer to individually set each variable as a public variable. As a result, the publishing setting of the variable to the external device becomes easier.

In another example of the present disclosure, a development assistance program executed by a development assistance device configured to communicate with a controller configured to control a drive device to be controlled in response to a control command specified in a user program causes the development assistance device to execute starting a development tool configured to develop the user program. At least one variable included in the user program belongs to a predetermined namespace. The development assistance program causes the development assistance device to further execute accepting, for the namespace, a publishing setting for causing the controller to determine whether to publish the variable belonging to the namespace to an external device that is communicatively connected to the controller, and transferring the user program and the publishing setting to the controller on the basis of acceptance of transfer operation of the user program by the development tool.

According to this disclosure, the publishing setting of the variable to the external device is performed for each namespace included in the user program, and whether to publish each variable is determined on the basis of the publishing setting set for the namespace. This eliminates the need for the designer to individually set each variable as a public variable. As a result, the publishing setting of the variable to the external device becomes easier.

Advantageous Effects of Invention

In a certain aspect, a publishing setting of a variable to an external device can be performed more easily.

BRIEF DESCRIPTION OF DRAWINGS

FIG. 7 shows an example of a data structure of publishing setting information according to a modification example.

FIG. 9 shows a publishing setting screen as another example of a user interface provided by a development tool.

FIG. 10 shows screen transition of a search screen obtained in a case where a namespace is input as a search key.

FIG. 11 shows screen transition of a search screen obtained in a case where a communication protocol is input as a search key.

DESCRIPTION OF EMBODIMENTS

Hereinafter, embodiments of the present invention will be described with reference to the drawings. In the following description, the same parts and components will be denoted by the same reference signs. Names and functions thereof are also the same. Therefore, detailed description thereof will not be repeated.

A. Application Example

Figure 1:
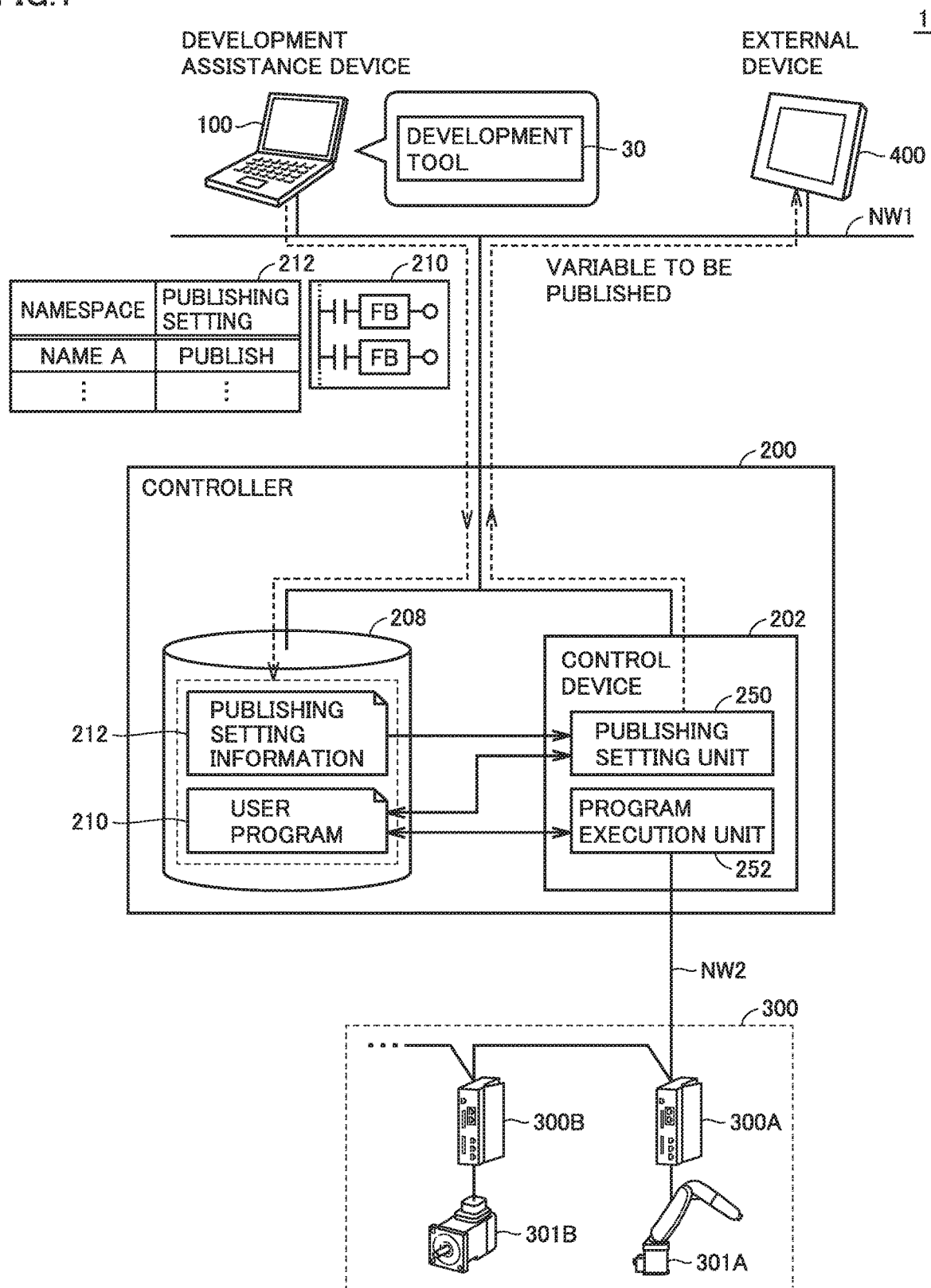
FIG. 1 shows a configuration example of a control system according to an embodiment.

Referring to FIG. 1, an application example of the present invention will be described. FIG. 1 shows a configuration example of a control system 1.

Control system 1 is an FA system for automating production processes. In the example of FIG. 1, control system 1 includes one or more development assistance devices 100, one or more controllers 200, one or more drive devices 300, and one or more external devices 400.

Development assistance device 100, controller 200, and external device 400 are connected to a network NW1. For network NW1, EtherNET (registered trademark), object linking and embedding for process control unified architecture (OPC-UA), or the like is adopted. The OPC-UA is a communication standard defined for implementing data exchange, without depending on the type of a vendor, operating system (OS), or the like. By using controller 200 compatible with the OPC-UA, external device 400 can easily access data (variables) managed in controller 200.

Development assistance device 100 is, for example, a laptop or desktop personal computer (PC), a tablet terminal, a smartphone, or another information processing device capable of developing a control program for controller 200. External device 400 is, for example, a human machine interface (HMI), a laptop or desktop PC, a server, a tablet terminal, a smartphone, or another display device.

Controller 200 and drive device 300 are connected to a network NW2. For network NW2, it is preferable to adopt a field network that performs cyclic communication and guarantees data arrival time. As the field networks that perform such cyclic communication, there are known EtherCAT (registered trademark), EtherNet/IP (registered trademark), CompoNet (registered trademark), and the like.

Drive device 300 includes various industrial devices for automating production processes. Examples of drive device 300 encompass a robot controller 300A, a servo driver 300B, an arm robot 301A controlled by robot controller 300A, and a servomotor 301B controlled by servo driver 300B. Drive device 300 may also include a visual sensor for capturing an image of a workpiece, another device for use in the production processes, and the like.

A development tool 30 is installable in development assistance device 100. Development tool 30 is an application for assisting in developing a control program for controller 200. Examples of development tool 30 encompass "Sysmac Studio" manufactured by OMRON Corporation. A designer can design a control program for controller 200 on development tool 30 and install the designed control program as a user program 210 in controller 200. User program 210 is typically transmitted to controller 200 as an executable file compiled by development assistance device 100.

The designer can specify an arbitrary namespace or variable for user program 210 on development tool 30. At least one variable included in user program 210 belongs to a predetermined namespace.

The "variable" is an identifier given to data used in a source code of user program 210. The "variable" is typically data showing a state of controller 200 or drive device 300. In other words, the "variable" refers to data whose value changes in accordance with a state of each configuration of controller 200 or drive device 300. The "variable" may include data indicating a value, data represented as an array, data represented as a structure, and various pieces of data that can be specified in user program 210.

The "namespace" is an abstraction for determining a scope of a set of variables. That is, the "namespace" includes one or more variables. The designer defines variables on the namespace defined by himself/herself. Variables having the same name defined in different namespaces are regarded as different variables. This reduces a possibility of collisions between variable names.

In this embodiment, development tool 30 of user program 210 is configured to set, for the namespace, a publishing setting (attribute) for causing controller 200 to determine whether to publish variables included in user program 210 to external device 400. That is, development tool 30 is configured to collectively set, for each namespace specified in user program 210, whether to publish variables belonging to the namespace. The term "publish" means to make variables accessible from external device 400. Meanwhile, the term "not publish" or "make private" means to make variables inaccessible from external device 400.

The set publishing setting is downloaded to controller 200 together with user program 210 as publishing setting information 212. User program 210 and publishing setting information 212 are downloaded to controller 200 as different pieces of data in the example of FIG. 1, but may be downloaded as integrated data.

Controller 200 includes a control device 202 and a storage device 208. Control device 202 includes a publishing setting unit 250 and a program execution unit 252 as functional configurations. Storage device 208 stores user program 210 and publishing setting information 212 downloaded from development assistance device 100.

Program execution unit 252 starts executing user program 210 on the basis of acceptance of a command to start executing user program 210. Thereafter, program execution unit 252 controls drive device 300 in response to a control command specified in user program 210. At this time, program execution unit 252 sequentially updates values of variables in accordance with an execution result of user program 210.

Publishing setting unit 250 sets publishing or not publishing of each variable on the basis of publishing setting information 212 received from development assistance device 100. As described above, publishing setting information 212 specifies, for each namespace, a publishing setting for determining publish/not publish. For a namespace whose publishing setting indicates publish, publishing setting unit 250 makes variables belonging to the namespace accessible from external device 400. Meanwhile, for a namespace whose publishing setting indicates not publish, publishing setting unit 250 makes variables belonging to the namespace inaccessible from external device 400.

In this way, the designer can set publish/not publish of variables for each namespace. Controller 200 collectively publishes variables belonging to a namespace whose setting indicates publish, and does not publish variables belonging to a namespace whose setting indicates "not publish". This eliminates the need for the designer to individually set publish/not publish of each variable included in user program 210. As a result, a publishing setting of the variable to external device 400 becomes easier, and the number of development steps is reduced, as compared with the related art.

The namespace is generally divided for each meaningful set by the designer. Therefore, the designer sets publish/not publish of variables for the namespace, thereby collectively setting publish/not publish of the variables for each meaningful set. For example, in a case where the namespace is defined for each controller name or drive device name, the designer can collectively set publish/not publish of variables of a variable group related to the controller or a variable group related to the drive device.

B. Sequence Flow

Figure 2:
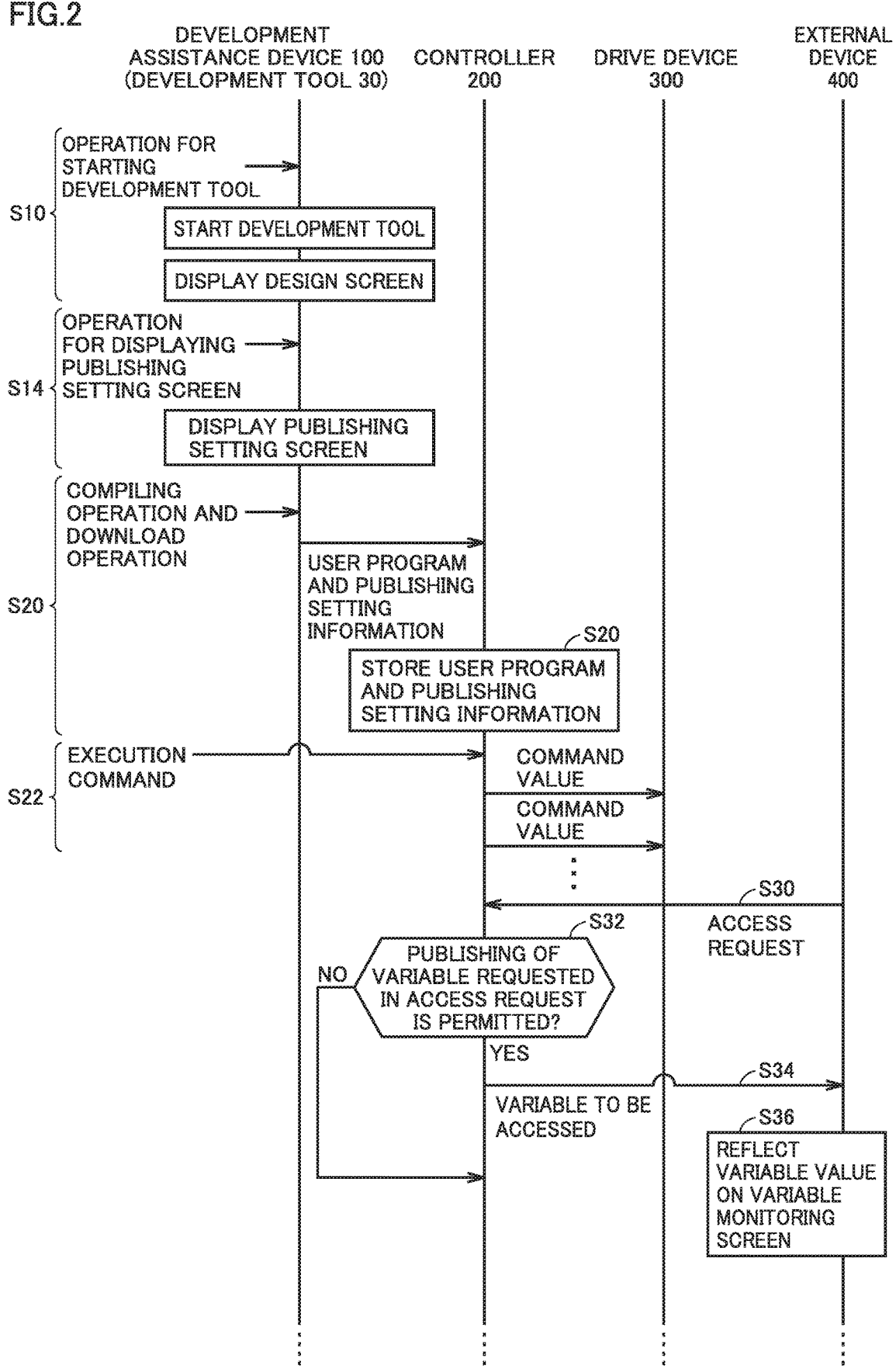
FIG. 2 is a sequence diagram showing a data flow among a development assistance device, a controller, a drive device, and an external device.

Referring to FIGS. 2 to 6, a processing flow regarding the above-described processing of setting a public variable/private variable will be described. FIG. 2 is a sequence diagram showing a data flow among development assistance device 100, controller 200, drive device 300, and external device 400.

Figure 3:
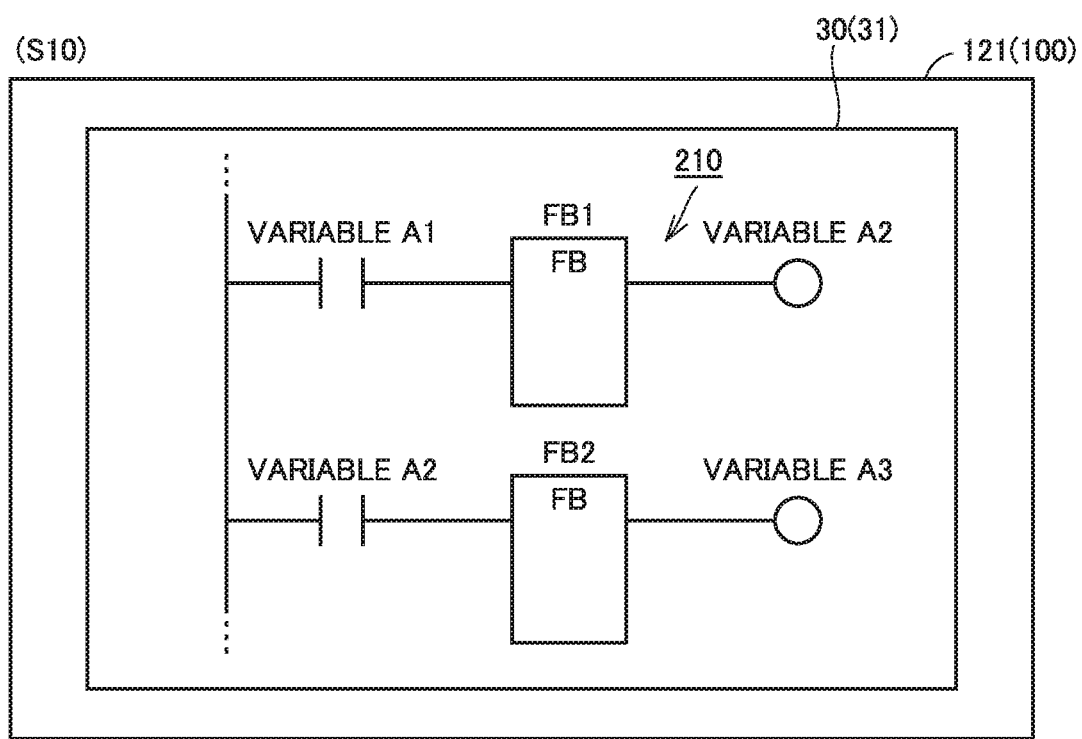
FIG. 3 shows a design screen as an example of a user interface provided by a development tool.

In step S10, development assistance device 100 accepts a command to start development tool 30. Based on this, development assistance device 100 displays a design screen of user program 210. FIG. 3 shows a design screen 31 as an example of a user interface provided by development tool 30. Design screen 31 is displayed on, for example, a display unit 121 of development assistance device 100.

User program 210 can be written in any programming language. As an example, user program 210 may be specified by a ladder diagram (LD), an instruction list (IL), a structured text (ST), a sequential function chart (SFC), or any combination thereof. Alternatively, user program 210 may be specified in a general-purpose programming language such as JavaScript (registered trademark) or C language.

In the example of FIG. 3, user program 210 is written by a ladder diagram. The designer can design user program 210 suitable for drive device 300 to be controlled by combining arbitrary function blocks or specifying an input/output relationship of variables and function blocks on design screen 31. The function block is a component into which a function repeatedly used in user program 210 is formed.

In the example of FIG. 3, user program 210 includes variables A1 to A3 and function blocks FB1 and FB2. Function block FB1 executes its function on the basis of a value of variable A1 associated with an input unit thereof. A result of the execution is reflected in variable A2 associated with an output unit of function block FB1. Function block FB2 executes its function on the basis of a value of variable A2 associated with an input unit thereof. A result of the execution is reflected in variable A3 associated with an output unit of function block FB2. As described above, the designer can design arbitrary user program 210 by combining variables and function blocks on design screen 31.

Referring to FIG. 2 again, in step S14, development tool 30 accepts call operation of a publishing setting screen. Based on this, development tool 30 displays the publishing setting screen.

Figure 4:
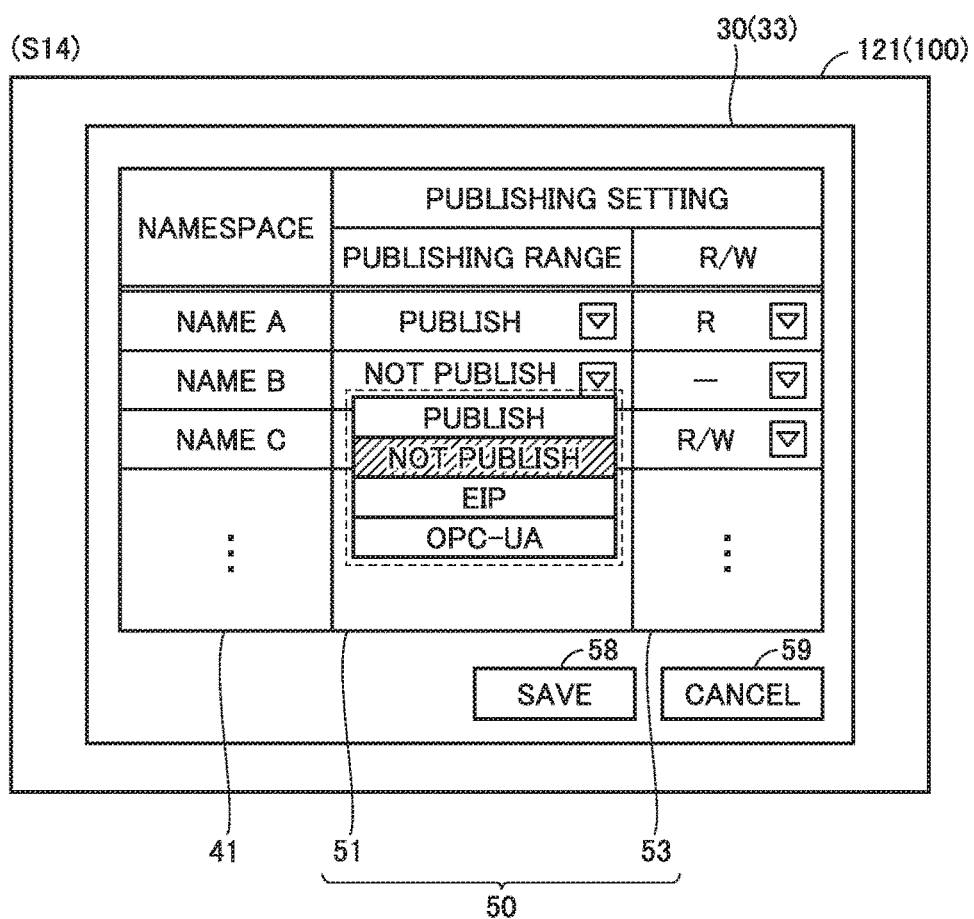
FIG. 4 shows a publishing setting screen as an example of a user interface provided by a development tool.

FIG. 4 shows a publishing setting screen 33 as an example of a user interface provided by development tool 30. Publishing setting screen 33 accepts, for each namespace specified in user program 210, a setting regarding publishing of variables.

More specifically, publishing setting screen 33 includes a display field 41 for namespaces and a setting field 50 for publishing settings. Setting field 50 for publishing settings includes a setting field 51 that accepts a setting of a publishing range, and a setting field 53 that accepts a setting of an access authority of a destination to which the variables are published (publishing destination).

Display field 41 displays a list of the namespaces specified in user program 210. The namespaces displayed in display field 41 may be automatically extracted from setting information of development tool 30, or may be edited by a user.

Setting field 51 accepts a setting of a publishing range of variables. The setting of the publishing range of the variables is specified by, for example, a communication protocol. As an example, setting field 51 displays pull-down menus arranged vertically so that each pull-down menu corresponds to each namespace. When the designer presses the pull-down menu, a list of communication protocol options is displayed. As an example, the options include "publish", "not publish", "EtherNet/IP (EIP)", and "OPC-UA". The designer can select an option from the displayed options.

In a case where "publish" is selected, variables included in a selected namespace are published to arbitrary external device 400, without depending on the communication protocol. In a case where "not publish" is selected, the variables included in the selected namespace are not published to external devices 400. In a case where "EIP" is selected, the variables included in the selected namespace are published only to external device 400 that implements communication by EtherNet/IP. In a case where "OPC-UA" is selected, the variables included in the selected namespace are published only to external device 400 connected to a communication network that implements communication by OPC-UA.

As described above, the publishing setting that can be set includes a communication setting for specifying a communication protocol. In a case where controller 200 and external device 400 communicate with each other by using the set communication protocol, publishing setting unit 250 of controller 200 publishes variables belonging to the namespace to be set to external device 400. Thus, controller 200 can divide public variables and private variables in accordance with the communication protocol. The type of the communication protocol is determined on the basis of, for example, information included in a communication packet.

Setting field 53 accepts a setting of an access authority of a publishing destination of variables. As an example, setting field 53 displays pull-down menus arranged vertically so that each pull-down menu corresponds to each namespace. When the designer presses the pull-down menu, a list of options regarding the access authority is displayed. As an example, the options include "R/W", "R", "W", and "-".

In a case where "R/W" is selected, development tool 30 gives an access authority to read and write the variables included in the selected namespace to external device 400 serving as the publishing destination. In a case where "R" is selected, development tool 30 gives an access authority to only read the variables included in the selected namespace to external device 400 serving as the publishing destination. In a case where "W" is selected, development tool 30 gives an access authority to only write the variables included in the selected namespace to external device 400 serving as the publishing destination. In a case where "-" is selected, development tool 30 gives an access authority not to read or write the variables included in the selected namespace to external device 400 serving as the publishing destination.

Note that the publishing setting does not necessarily need to be performed on publishing setting screen 33. For example, the publishing setting may be set on any screen provided by development tool 30. As an example, a list of namespaces is displayed on any screen provided by development tool 30 (e.g., design screen 31). On the basis that the designer has selected a namespace from the list of the namespaces, a screen for performing a publishing setting of the selected namespace may be displayed.

In a case where a save button 58 on publishing setting screen 33 is pressed, development assistance device 100 saves the publishing setting set on publishing setting screen 33 as publishing setting information 212. In a case where a cancel button 59 on publishing setting screen 33 is pressed, development assistance device 100 closes publishing setting screen 33, without saving the publishing setting set on publishing setting screen 33.

Figure 5:
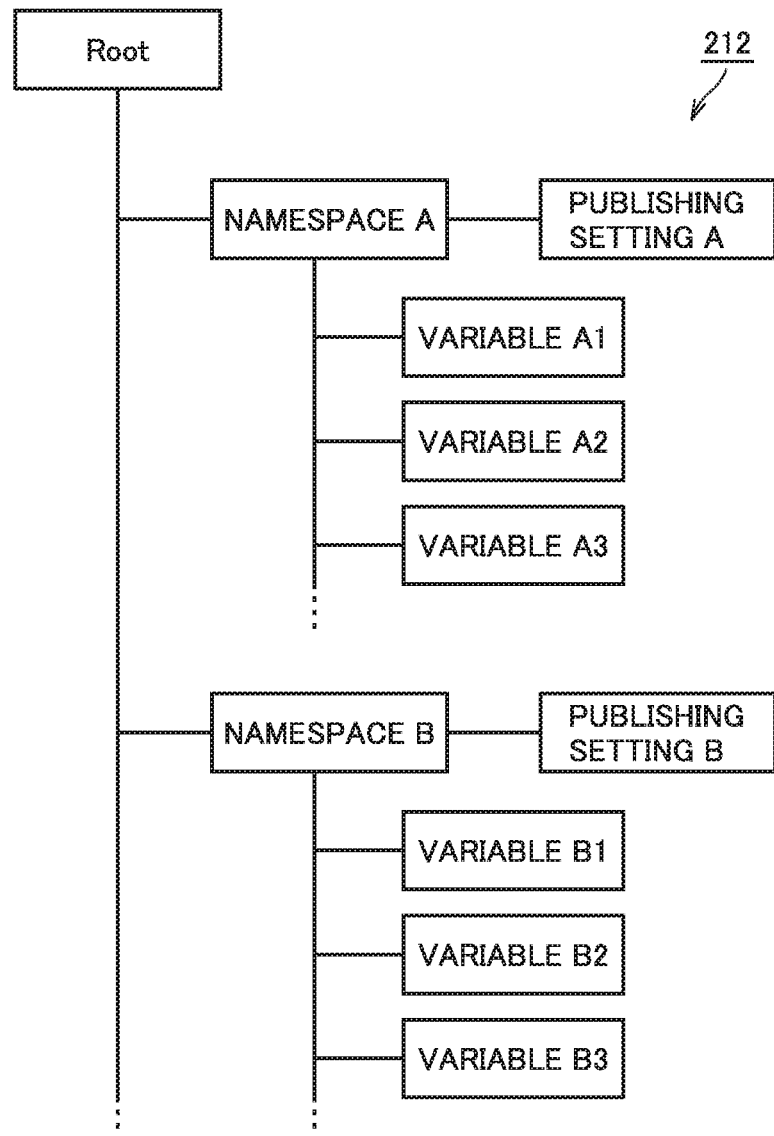
FIG. 5 shows an example of a data structure of publishing setting information.

FIG. 5 shows an example of a data structure of saved publishing setting information 212. As shown in FIG. 5, publishing setting information 212 associates variables with a publishing setting for each namespace specified in user program 210. As an example, a plurality of namespaces specified in user program 210 are associated with "Root". A "variable A1" to a "variable A3" are associated with a namespace represented as a "name A". "Variable A1" to "variable A3" shown in FIG. 5 correspond to "variable A1" to "variable A3" shown in FIG. 3. In the example of FIG. 5, a "publishing setting A" is associated with the namespace represented as "name A". "Publishing setting A" corresponds to contents set for the namespace of "name A" in setting field 50 (see FIG. 4) of publishing setting screen 33.

Referring to FIG. 2 again, in step S20, development tool 30 accepts compiling operation. Based on this, development tool 30 compiles user program 210 designed on design screen 31 in step S14. Thereafter, development tool 30 accepts download operation for transferring a compilation result to controller 200. Based on this, development tool 30 transfers publishing setting information 212 generated in step S14 together with compiled user program 210 to controller 200. Controller 200 stores received user program 210 and publishing setting information 212 in storage device 208 (see FIG. 1).

In step S22, controller 200 accepts a command to execute user program 210. Based on this, controller 200 starts executing user program 210. In a case where user program 210 is a cyclic executive program, controller 200 repeatedly executes a command group included in user program 210 at each predetermined control cycle. More specifically, controller 200 executes the first to last lines of user program 210 in one control cycle. In the next control cycle, controller 200 executes the first to last lines of user program 210 again. Controller 200 generates a command value at each control cycle, and outputs the command value to drive device 300.

In step S30, controller 200 receives a request to access an internal variable from external device 400 during execution of user program 210.

In step S32, controller 200 refers to publishing setting information 212 (see FIG. 5) described above and determines whether or not publishing of the variable requested in the access request is permitted. More specifically, controller 200 determines that publishing of the variable to be accessed is permitted in a case where a publishing range condition, a publishing destination condition, and an access authority condition are satisfied.

More specifically, the publishing range condition is satisfied in any of the following cases (a1) to (a3).

(a1) A case where "publish" is specified for the namespace to which the variable to be accessed belongs.

(a2) A case where, when "EIP" is specified for the namespace to which the variable to be accessed belongs, communication with external device 400 serving as an access request source is realized by EtherNet/IP.

(a3) A case where, when "OPC-UA" is specified for the namespace to which the variable to be accessed belongs, communication with external device 400 serving as the access request source is implemented by OPC-UA.

The access authority condition is satisfied in any of the following cases (b1) and (b2).

(b1) A case where, when the access request is a "Read" request, the access authority set for the namespace to which the variable to be accessed belongs is set to "R" or "R/W".

(b2) A case where, when the access request is a "Write" request, the access authority set for the namespace to which the variable to be accessed belongs is set to "W" or "R/W".

In a case where controller 200 determines that publishing of the variable requested in the access request is permitted (YES in step S32), controller 200 executes processing in step S34. If not (NO in step S32), controller 200 does not execute the processing in step S34.

In step S34, in a case where the access request is a "Read" request, controller 200 transmits the variable to be accessed to external device 400. In a case where the access request is "Write", controller 200 rewrites the variable to be accessed to a specified variable, and transmits the rewritten result to external device 400.

Figure 6:
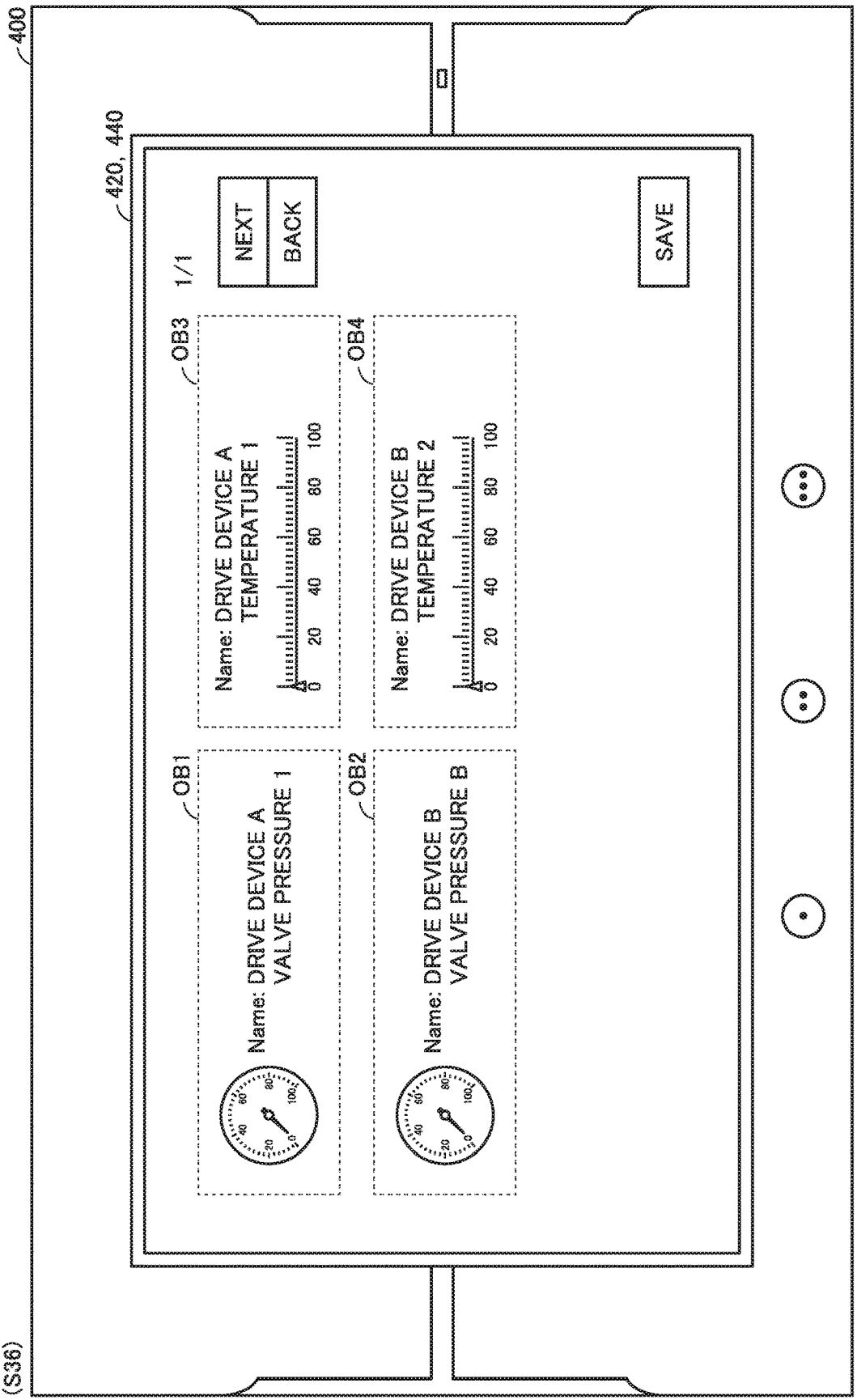
FIG. 6 shows a variable monitoring screen as an example of a user interface provided by an external device.

In step S36, external device 400 reflects the variable received from drive device 300 on the variable monitoring screen. FIG. 6 shows a variable monitoring screen 440 as an example of a user interface provided by external device 400. Variable monitoring screen 440 is displayed on, for example, a display unit 420 of external device 400.

In the example of FIG. 6, external device 400 includes objects OB1 to OB4. Each of objects OB1 to OB4 is associated with any variable, and graphically shows a value of the variable.

Object OB1 is, for example, an image showing a tachometer. Object OB1 is associated with a variable indicating a valve pressure value of a drive device A, and the meter of object OB1 is sequentially updated in accordance with the value of the variable.

Object OB2 is, for example, an image showing a tachometer. Object OB2 is associated with a variable indicating a valve pressure value of a drive device B, and the meter of object OB2 is sequentially updated in accordance with the value of the variable.

Object OB3 is, for example, an image showing a thermometer. Object OB3 is associated with a variable indicating a temperature of drive device A, and the meter of object OB3 is sequentially updated in accordance with a value of the variable.

Object OB4 is, for example, an image showing a thermometer. Object OB4 is associated with a variable indicating a temperature of drive device B, and the meter of object OB4 is sequentially updated in accordance with a value of the variable.

C. Modification Example of Publishing Setting Information

Referring to FIG. 7, a modification example of publishing setting information 212 described with reference to FIG. 5 will be described. FIG. 7 shows an example of a data structure of publishing setting information 212A according to the modification example.

In publishing setting information 212 described above, a publishing setting is associated with a namespace. Meanwhile, in publishing setting information 212A according to the modification example, a publishing setting is associated not only with a namespace but also with each variable. The publishing setting for each variable can be set on, for example, publishing setting screen 33 of development tool 30 described above. That is, publishing setting screen 33 is configured to accept not only the publishing setting for the namespace but also the publishing setting for each variable belonging to each namespace.

Contents of the publishing setting that can be set for the variable are typically the same as contents of the publishing setting that can be set for the namespace. As an example, the publishing setting for the variable includes a communication setting for specifying a communication protocol to be permitted. In addition, the publishing setting for the variable includes a publishing destination setting for specifying a publishing destination. In addition, the publishing setting for the variable includes an access authority setting of external device 400 serving as the publishing destination.

Development tool 30 preferably reflects the publishing setting for the namespace as an initial value in the publishing setting for the variable. More specifically, on the basis that the publishing setting for the namespace has been set, development tool 30 causes each publishing setting associated with each variable belonging to the namespace to inherit the publishing setting for the namespace. In the example of FIG. 7, "publishing setting A" set for "namespace A" is inherited by "variable A1" and "variable A2" belonging to "namespace A". This facilitates the publishing setting for the variable.

The designer can individually change each inherited publishing setting on publishing setting screen 33. In the example of FIG. 7, the publishing setting of "variable A2" is changed from "publishing setting A" to "publishing setting B". Thus, the designer can not only reduce time for performing the publishing setting of each variable, but also flexibly switch a setting between publish/not publish of each variable in accordance with individual circumstances.

Publishing setting unit 250 (see FIG. 1) of controller 200 preferably determines whether to publish the variable belonging to the namespace to external device 400 by prioritizing the publishing setting for each variable over the publishing setting for the namespace. That is, in a case where the publishing setting for the variable is set, publishing setting unit 250 determines whether to publish a target variable on the basis of the publishing setting for the variable while ignoring the publishing setting for the namespace. In the example of FIG. 7, publishing setting unit 250 determines publish/not publish of "variable A1" on the basis of "publishing setting A", and determines publish/not publish of "variable A2" on the basis of "publishing setting B".

It can be typically expected that, as a usage mode, a publishing setting is performed for the namespace and thereafter publishing settings are individually performed for the variables. Therefore, the publishing setting individually set for each variable is more likely to reflect intention of the designer than the publishing setting set for the namespace. The intention of the designer is reflected more reliably by prioritizing the publishing setting for the variable over the publishing setting for the namespace.

In the above description, there has been described an example where the publishing setting set for the namespace is inherited by the variable belonging to the namespace. However, a publishing setting set for a higher namespace may be inherited by a lower namespace. More specifically, the designer can hierarchically define namespaces in development tool 30. The higher namespace can include one or more lower namespaces. In such a case, development tool 30 causes the lower namespace to inherit a publishing setting of the higher namespace. Meanwhile, development tool 30 does not cause the higher namespace to inherit a publishing setting of the lower namespace.

D. Modification Example 1 of Publishing Setting Screen 33

The publishing settings are set by using the pull-down menus on publishing setting screen 33 described with reference to FIG. 4, but the publishing settings may be set by another method. Hereinafter, referring to FIG. 8, a modification example of publishing setting screen 33 shown in FIG. 4 will be described.

Figure 8:
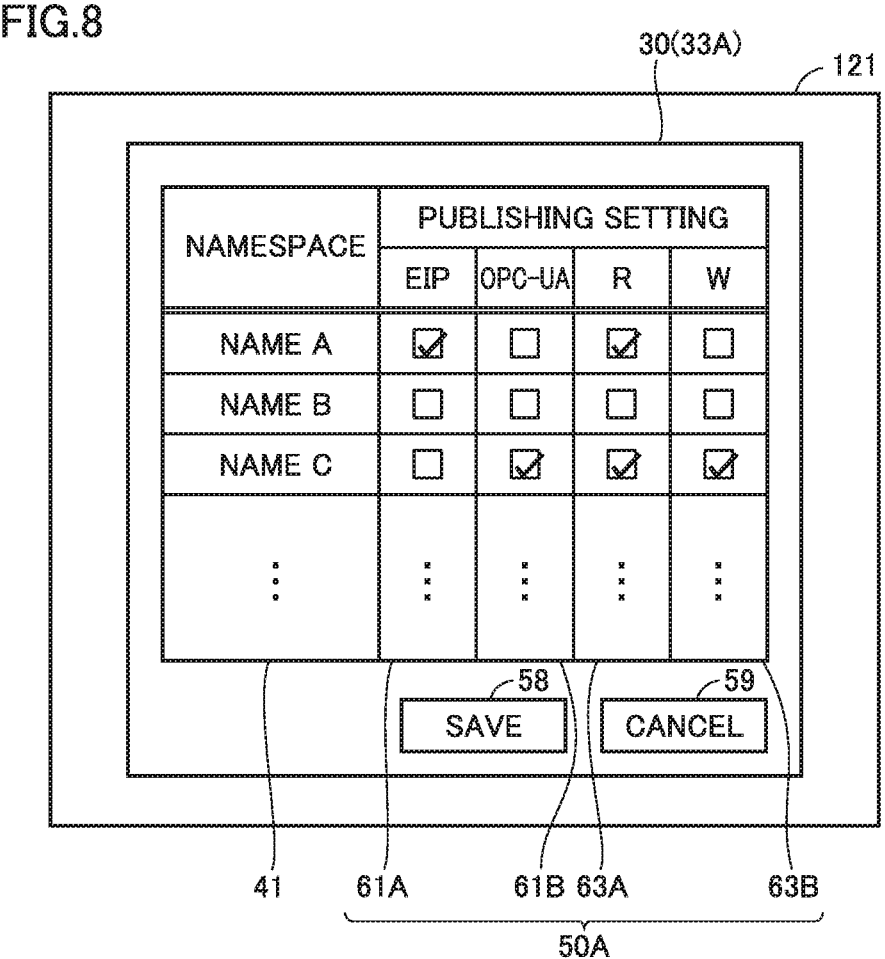
FIG. 8 shows a publishing setting screen as another example of a user interface provided by a development tool.

FIG. 8 shows a publishing setting screen 33A as another example of the user interface provided by development tool 30. Publishing setting screen 33A is a modification example of publishing setting screen 33 described above with reference to FIG. 4.

As shown in FIG. 8, publishing setting screen 33A includes a display field 41 for namespaces and a setting field 50A for publishing settings. Setting field 50A for publishing settings includes setting fields 61A and 61B that accept a setting of a communication protocol, and setting fields 63A and 63B that accept a setting of an access authority of a publishing destination.

Display field 41 displays a list of the namespaces specified in user program 210. The namespaces displayed in display field 41 may be automatically extracted from setting information of development tool 30, or may be edited by a user.

Setting fields 61A and 61B accept a setting regarding a communication protocol. As an example, checkboxes are displayed side by side in setting fields 61A and 61B so as to correspond to each namespace. The checkboxes are provided in accordance with the number of communication protocols with which controller 200 is compatible. In the example of FIG. 8, "EIP" and "OPC-UA" are shown as selectable communication protocols.

In a case where the checkbox of "EIP" is selected, variables included in the corresponding namespace are published to external device 400 that performs communication by EtherNet/IP. In a case where the checkbox of "OPC-UA" is selected, variables included in the corresponding namespace are published to external device 400 that performs communication by OPC-UA. In a case where none of the checkboxes is selected, variables included in the corresponding namespace are not published to external device 400.

Setting fields 63A and 63B accept a setting of an access authority of a publishing destination of variables. As an example, checkboxes are displayed side by side in setting fields 63A and 63B so as to correspond to each namespace. The checkboxes are provided in accordance with the number of types of access authority. In the example of FIG. 8, "R" and "W" are shown as selectable access authorities.

In a case where both "R" and "W" are selected, development tool 30 gives an access authority to read and write variables included in a selected namespace to external device 400 serving as the publishing destination. In a case where only "R" is selected, development tool 30 gives an access authority to only read the variables included in the selected namespace to external device 400 serving as the publishing destination. In a case where only "W" is selected, development tool 30 gives an access authority to only write the variables included in the selected namespace to external device 400 serving as the publishing destination. In a case where both "R" and "W" are not selected, development tool 30 gives an access authority not to read or write the variables included in the selected namespace to external device 400 serving as the publishing destination.

In a case where save button 58 on publishing setting screen 33A is pressed, development assistance device 100 saves the publishing setting set on publishing setting screen 33A as publishing setting information 212. In a case where cancel button 59 on publishing setting screen 33A is pressed, development assistance device 100 closes publishing setting screen 33A, without saving the publishing setting set on publishing setting screen 33A.

E. Modification Example 2 of Publishing Setting Screen 33

Referring to FIG. 9, another modification example of publishing setting screen 33 described with reference to FIG. 4 will be described. FIG. 9 shows a publishing setting screen 33B as another example of the user interface provided by development tool 30. Publishing setting screen 33B is a modification example of publishing setting screen 33 described above with reference to FIG. 4.

A setting field 50 for publishing settings on publishing setting screen 33B is different from that on publishing setting screen 33 shown in FIG. 4 in that setting field 50 further includes a setting field 56 for setting holding/non-holding of variables. The other points are the same as those described with reference to FIG. 4, and description thereof will not be repeated below.

Setting field 56 accepts a setting of holding/non-holding of variables for each namespace. As an example, setting field 56 displays checkboxes arranged vertically so that each checkbox corresponds to each namespace. Variables belonging to the namespace selected in setting field 56 are stored in a nonvolatile storage device (e.g., a storage device 110 described below) in development assistance device 100. That is, values of the variables are held even in a case where a power supply of development assistance device 100 is turned off. Meanwhile, variables belonging to namespaces not selected in setting field 56 are stored in a volatile storage device (e.g., a main memory 104 described below) in development assistance device 100. That is, values of the variables are not held in a case where the power supply of development assistance device 100 is turned off.

F. Variable Search Screen

Referring to FIGS. 10 and 11, a variable search function using contents of a publishing setting as a search key will be described. FIG. 10 shows screen transition of a search screen 35 obtained in a case where a namespace is input as the search key. FIG. 11 shows screen transition of search screen 35 obtained in a case where a communication protocol is input as the search key.

Search screen 35 includes an input unit 71 that accepts a namespace as the search key, an input unit 72 that accepts a variable name as the search key, an input unit 73 that accepts a communication protocol as the search key, and a display area 74 for a search result.

Based on input of the search key to input units 71 to 73, development assistance device 100 searches for variables corresponding to the input search key by referring to publishing setting information 212 (see FIG. 5) described above. Then, development assistance device 100 displays each variable extracted as a search result and a publishing setting set for the each variable side by side. Thus, the designer can easily check the publishing setting set for each variable.

For example, as shown in FIG. 10, "name A" is input to input unit 71. Based on this, development assistance device 100 searches for variables belonging to the namespace of "name A" by referring to publishing setting information 212 (see FIG. 5). Then, development assistance device 100 displays each variable extracted as a search result and a publishing setting set for each variable side by side.

As another example, as shown in FIG. 11, a checkbox of "EIP" in input unit 73 is selected. Based on this, development assistance device 100 searches for variables whose publishing settings indicate "EIP" by referring to publishing setting information 212 (see FIG. 5). Then, development assistance device 100 displays each variable extracted as a search result and a publishing setting set for the each variable side by side.

G. Hardware Configuration

Figure 12:
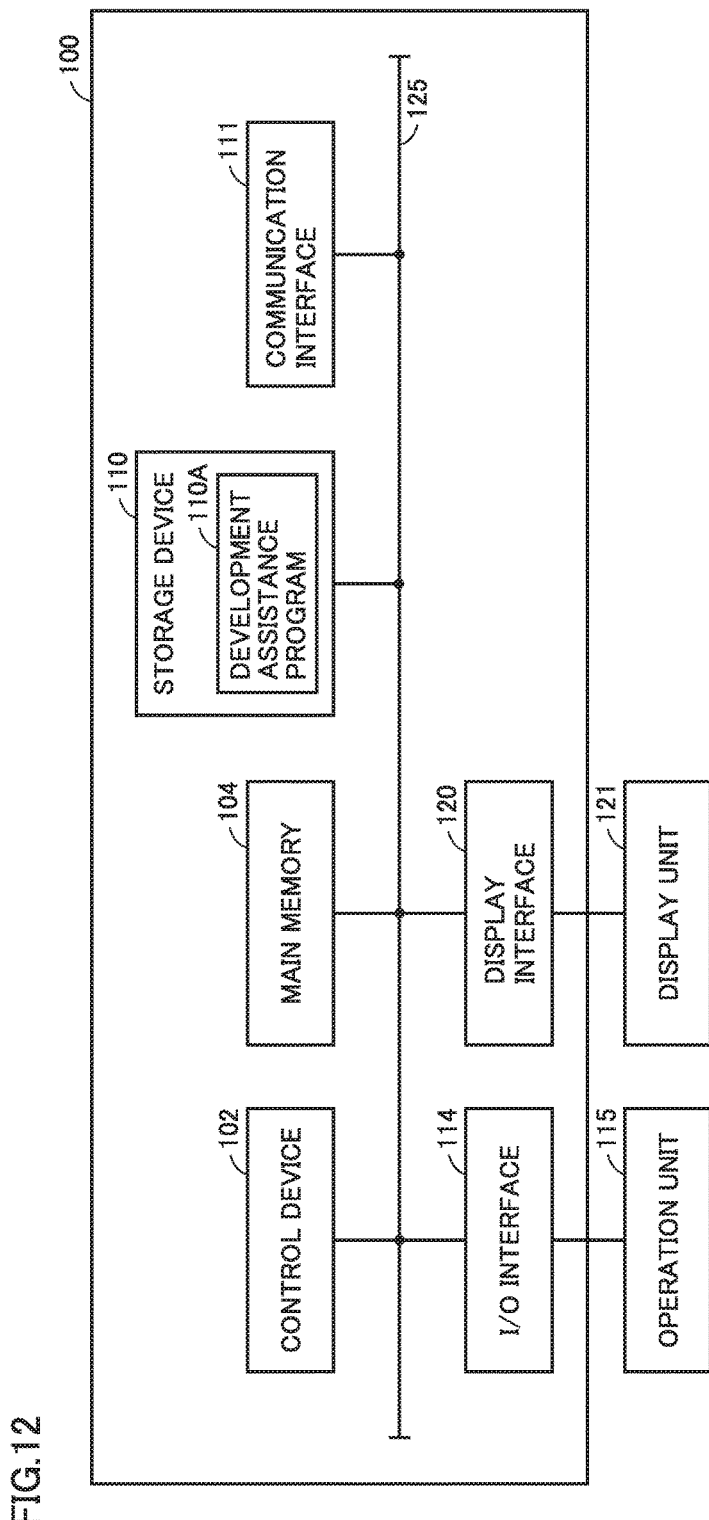
FIG. 12 is a schematic diagram showing a hardware configuration of a development assistance device according to an embodiment.
Figure 13:
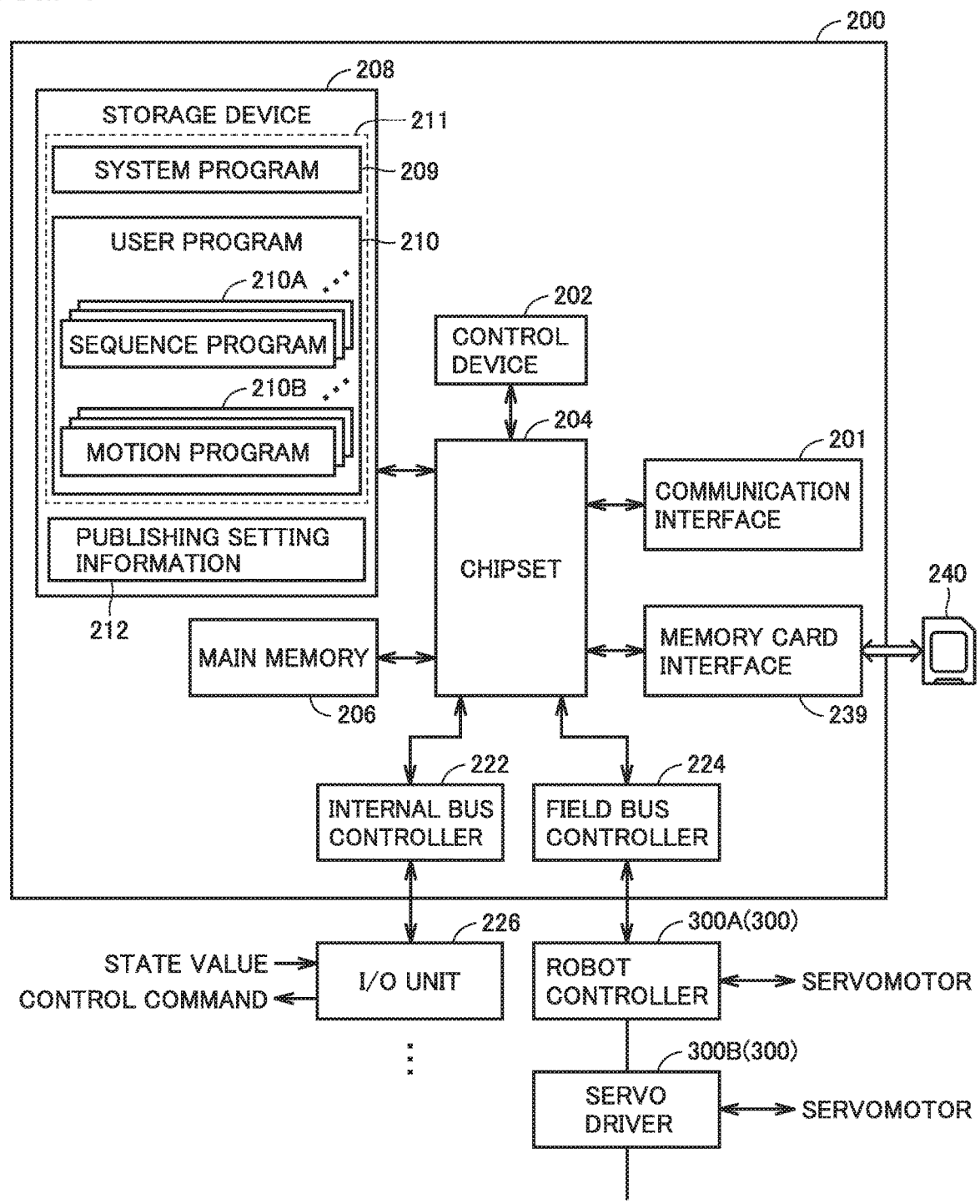
FIG. 13 is a schematic diagram showing an example of a hardware configuration of a controller according to an embodiment.
Figure 14:
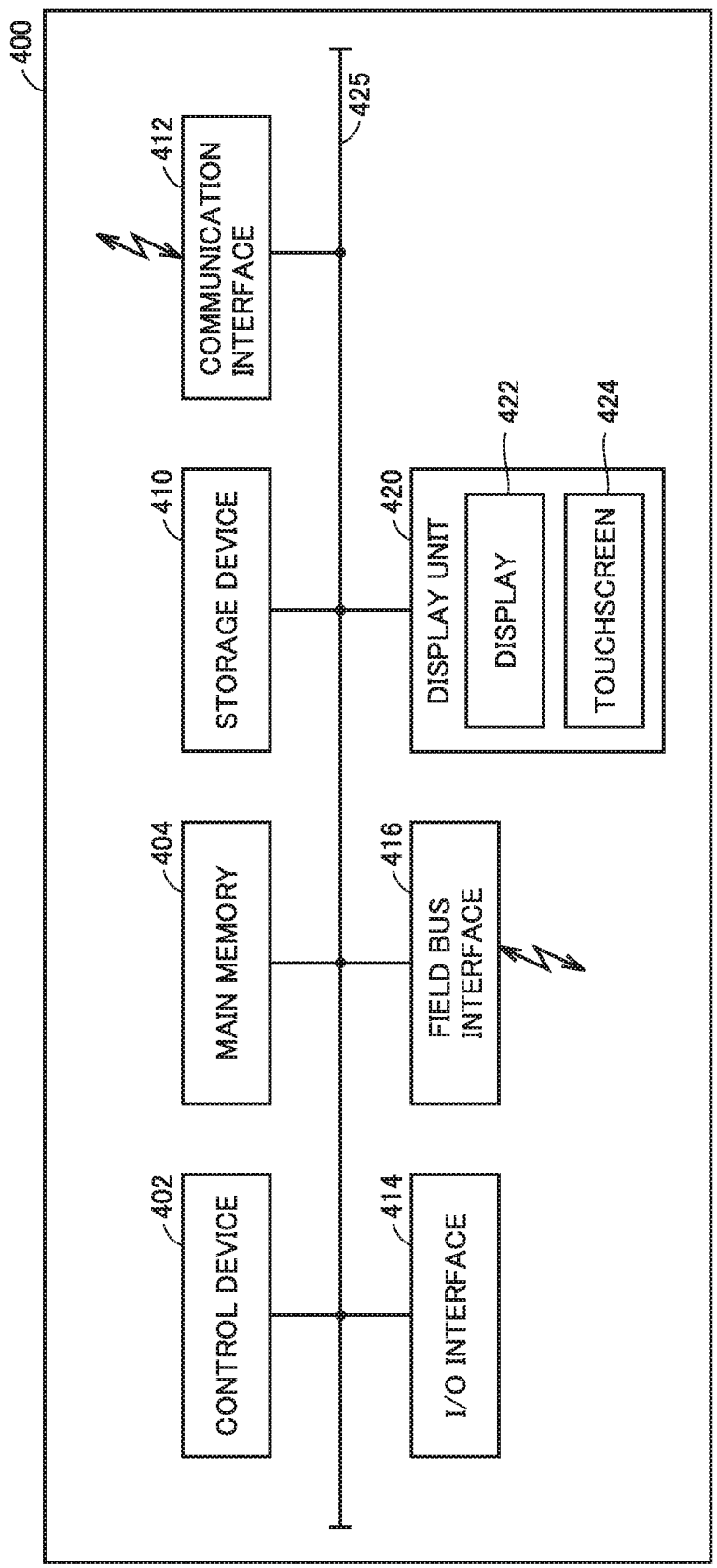
FIG. 14 is a block diagram showing a hardware configuration of an external device according to an embodiment.

Referring to FIGS. 12 to 14, hardware configurations of development assistance device 100, controller 200, and external device 400 will be described in order.

(G1. Hardware Configuration of Development Assistance Device 100)

First, referring to FIG. 12, the hardware configuration of development assistance device 100 will be described. FIG. 12 is a schematic diagram showing the hardware configuration of development assistance device 100.

Development assistance device 100 includes a computer configured in conformity with a general-purpose computer architecture as an example. Development assistance device 100 includes a control device 102 such as a central processing unit (CPU) or a micro-processing unit (MPU), volatile main memory 104, nonvolatile storage device 110 such as a flash memory, a communication interface 111, an input/output (I/O) interface 114, and a display interface 120. Those components are communicably connected to each other via an internal bus 125.

Control device 102 implements various kinds of processing in development tool 30 by loading a development assistance program 110A stored in storage device 110 into main memory 104 and executing development assistance program 110A. Development assistance program 110A is a program for providing a development environment of user program 210. Storage device 110 stores not only development assistance program 110A but also various types of data and the like generated in development tool 30. The data includes, for example, user program 210 designed on development tool 30 and publishing setting information 212 described above.

Communication interface 111 exchanges data with another communication device via a network. Examples of the other communication device encompass controller 200, external device 400, and a server. Development assistance device 100 may be configured to download various programs such as development assistance program 110A from the other communication device via communication interface 111.

I/O interface 114 is connected to an operation unit 115, and receives a signal indicating user operation from operation unit 115. Operation unit 115 typically includes a keyboard, a mouse, a touchscreen, a touchpad, and the like, and accepts operation from the user.

Display interface 120 is connected to display unit 121, and transmits an image signal for displaying an image to display unit 121 in response to a command from control device 102 or the like. Display unit 121 includes a liquid crystal display (LCD), an organic electro luminescence (EL) display, or the like, and presents various types of information to the user. Various screens provided by development tool 30 can be displayed on display unit 121. In the example of FIG. 12, development assistance device 100 and display unit 121 are shown as separate components, but development assistance device 100 and display unit 121 may be integrally configured.

(G2. Hardware Configuration of Controller 200)

Next, referring to FIG. 13, the hardware configuration of controller 200 will be described. FIG. 13 is a schematic diagram showing an example of the hardware configuration of controller 200.

Controller 200 includes a communication interface 201, control device 202 such as a CPU or an MPU, a chipset 204, a main memory 206, storage device 208, an internal bus controller 222, a field bus controller 224, and a memory card interface 239.

Control device 202 reads a control program 211 stored in storage device 208, loads control program 211 into main memory 206, and executes control program 211, thereby implementing arbitrary control of robot controller 300A, servo driver 300B, and the like. Control program 211 includes various programs for controlling controller 200. As an example, control program 211 includes a system program 209, user program 210, and the like. System program 209 includes command codes for providing basic functions of controller 200, such as data input/output processing and execution timing control. User program 210 is downloaded from development assistance device 100. User program 210 is arbitrarily designed in accordance with a target to be controlled, and includes a sequence program 210A for executing sequence control and a motion program 210B for executing motion control.

Chipset 204 controls each component, thereby implementing processing of the entire controller 200.

Internal bus controller 222 is an interface that exchanges data with various devices connected to controller 200 via an internal bus. As an example of such devices, an I/O unit 226 is connected.

Field bus controller 224 is an interface that exchanges data with various drive devices 300 connected to controller 200 via a field bus. As an example of such devices, robot controller 300A and servo driver 300B are connected. In addition, a drive device such as a visual sensor may be connected.

Internal bus controller 222 and field bus controller 224 can give an arbitrary command to the connected device, and can acquire arbitrary data managed by the device. Further, internal bus controller 222 and/or field bus controller 224 also function as an interface for exchanging data with robot controller 300A and servo driver 300B.

Communication interface 201 controls exchange of data via various wired/wireless networks. Controller 200 communicates with development assistance device 100 and external device 400 via communication interface 201.

Memory card interface 239 is configured so that a memory card 240 (e.g., SD card), which is an example of an external storage medium, is detachable, and can write data to the memory card 240 and read data from the memory card 240.

(G3. Hardware Configuration of External Device 400)

Next, referring to FIG. 14, the hardware configuration of external device 400 will be described. FIG. 14 is a block diagram showing the hardware configuration of external device 400.

External device 400 has a hardware configuration having a general-purpose architecture. That is, external device 400 is implemented as a kind of personal computer. However, external device 400 may be implemented by using dedicated hardware, instead of general-purpose hardware.

More specifically, external device 400 includes a control device 402 such as a CPU or an MPU, a main memory 404, a storage device 410 such as a flash memory, a communication interface 412, an I/O interface 414, a field bus interface 416, and a display unit 420. Those components are connected via an internal bus 425 so as to perform data communication with each other.

Control device 402 reads a control program (not shown) stored in storage device 410, loads the control program into main memory 404, and executes the control program, thereby controlling external device 400. That is, control device 402 is combined with main memory 404 and storage device 410 to realize a control unit that executes control operation.

Communication interface 412, I/O interface 414, and field bus interface 416 mediate exchange of data between external device 400 and another communication device.

More specifically, communication interface 412 mediates communication with controller 200 via network NW1 (see FIG. 1) or the like. For communication interface 412, for example, a component capable of performing communication conforming to EtherNET can be adopted.

I/O interface 414 mediates communication with various user interface devices (e.g., keyboard and mouse). For I/O interface 414, for example, a component capable of performing USB communication or serial communication can be adopted.

Field bus interface 416 mediates exchange of data with controller 200. For field bus interface 416, for example, a component capable of performing communication conforming to EtherCAT can be adopted.

Display unit 420 presents various types of information to the user and accepts operation from the user. More specifically, display unit 420 includes a display 422 and a touchscreen 424. Display 422 typically includes an LCD, an organic EL display, or the like. Touchscreen 424 is mounted on display 422 and accepts touch operation by the user. Display 422 is typically a pressure-sensitive or press-type device.

H. Functional Configuration of Controller 200

Figure 15:
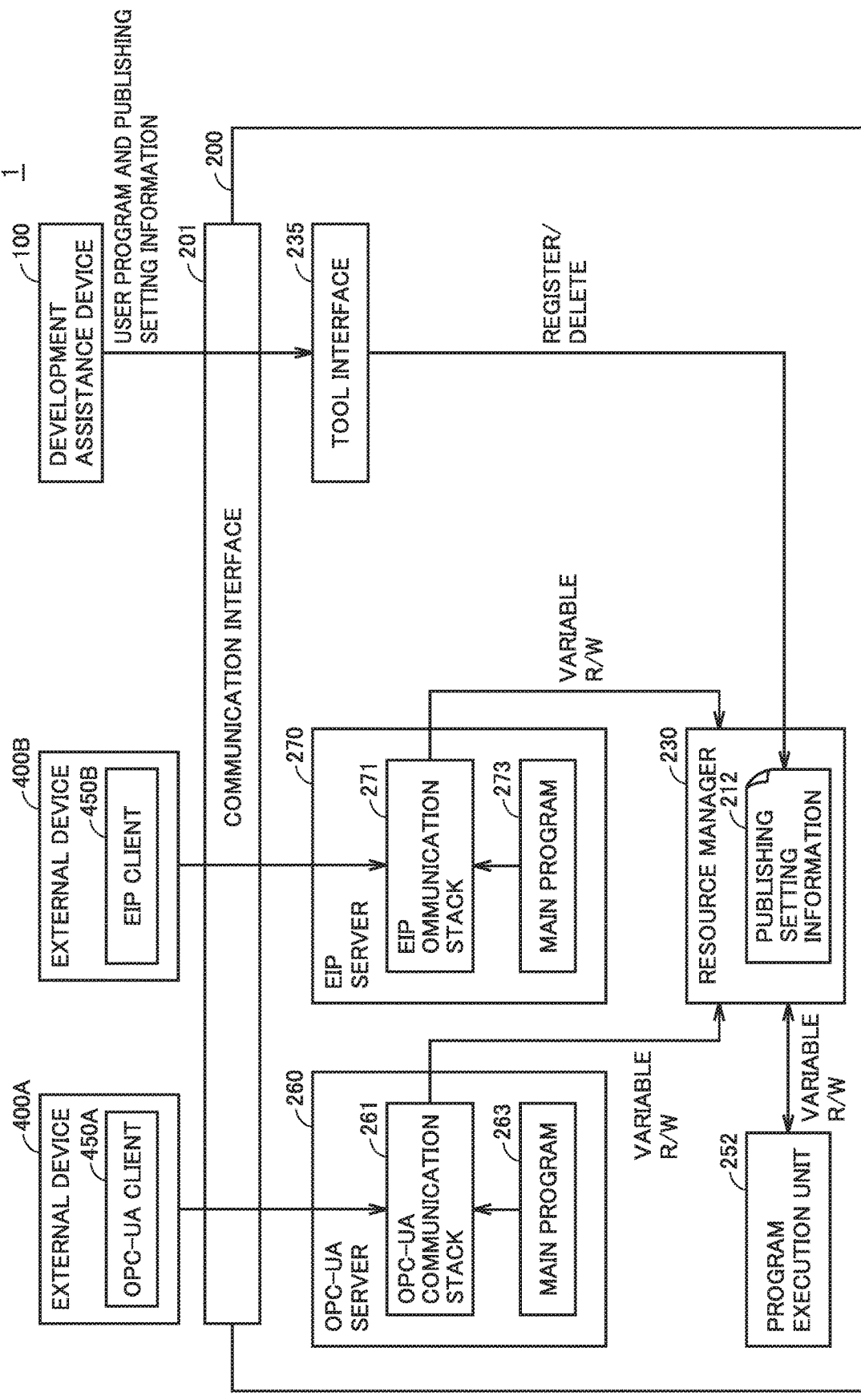
FIG. 15 shows an example of a functional configuration of a controller according to an embodiment.

Referring to FIG. 15, a function of controller 200 will be described. FIG. 15 shows an example of a functional configuration of controller 200.

Controller 200 includes communication interface 201, a resource manager 230, an event management unit 232, a tool interface 235, a nonvolatile memory 236, a program execution unit 252, an OPC-UA server 260, and an EIP server 270.

Communication interface 201 communicates with an external device 400A functioning as an OPC-UA client 450A, an external device 400B functioning as an EIP client 450B, and development assistance device 100. Development tool 30 of user program 210 is installed in development assistance device 100. Tool interface 235 receives user program 210 designed on development tool 30 and publishing setting information 212 set on development tool 30 via communication interface 201.

Resource manager 230 holds substance of each variable in controller 200, and performs management of each variable, reading and writing each variable, and the like. As an example, in a case where resource manager 230 receives a command to read (command to acquire) a variable, resource manager 230 accesses the variable to be read and transmits the variable to a source that has transmitted the read command. In a case where resource manager 230 receives a command to write a variable, resource manager 230 accesses the variable to be written and rewrites the variable to a specified value. The commands to read and write each variable are issued from, for example, program execution unit 252, OPC-UA server 260, and EIP server 270.

Further, resource manager 230 holds publishing setting information 212 that specifies a relationship among a namespace, a variable, and a publishing setting. Publishing setting information 212 is read from storage device 208 (see FIG. 13) of controller 200. Upon receipt of a command to register definition of a namespace and a variable or a command to delete the definition thereof, resource manager 230 performs registration processing or deletion processing on publishing setting information 212.

OPC-UA server 260 includes an OPC-UA communication stack 261 and a main program 263. OPC-UA communication stack 261 temporarily holds transmission data to OPC-UA client 450A and reception data from OPC-UA client 450A. Main program 263 is software for implementing a server function of OPC-UA server 260.

EIP server 270 includes an EIP communication stack 271 and a main program 273. EIP communication stack 271 temporarily holds transmission data to EIP client 450B and reception data from EIP client 450B. Main program 273 is software for implementing a server function of EIP server 270.

I. Control Flow of Development Assistance Device 100

Figure 16:
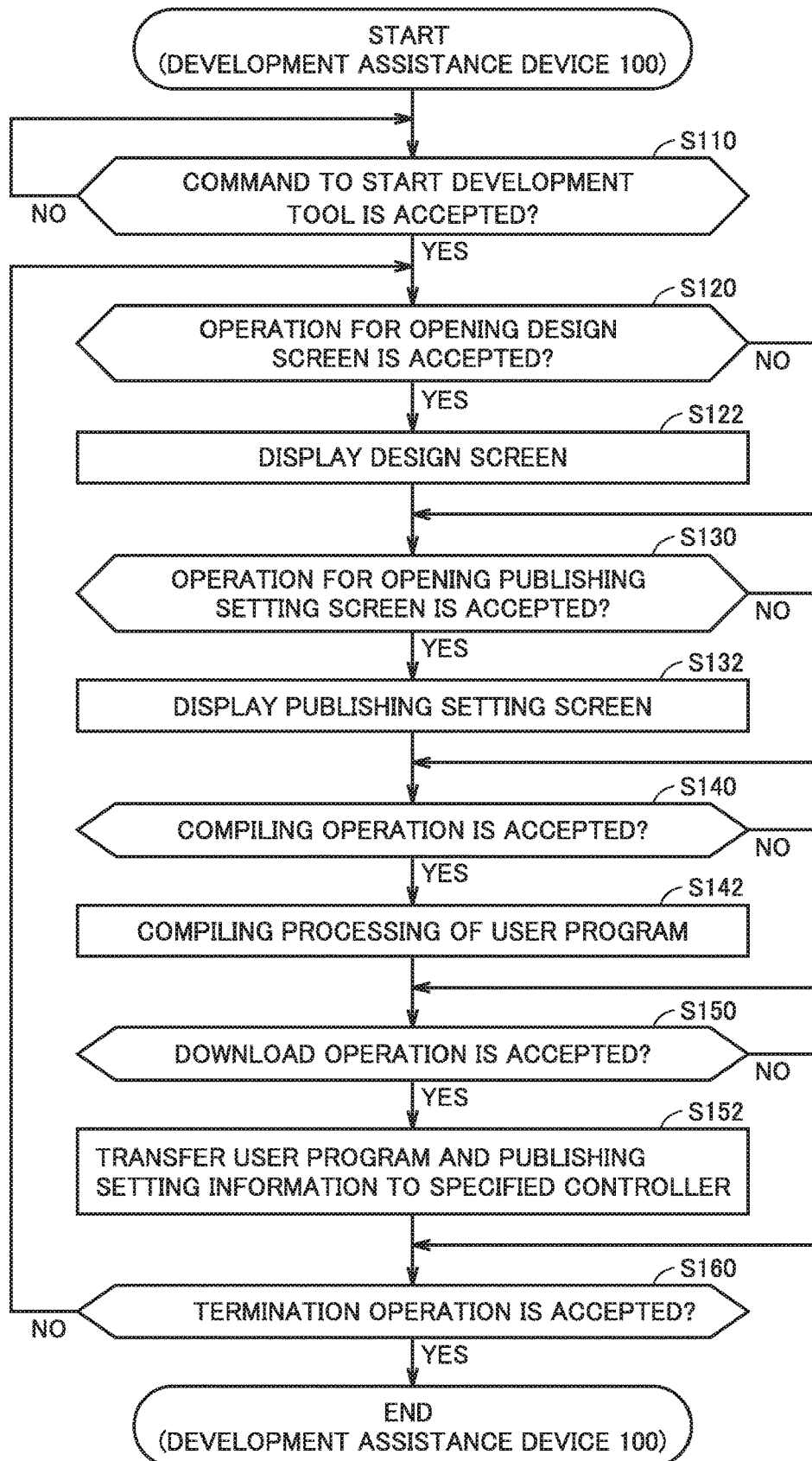
FIG. 16 is a flowchart showing a part of processing executed by a development assistance device according to an embodiment.

Referring to FIG. 16, a control structure of development assistance device 100 will be described. FIG. 16 is a flowchart showing a part of processing executed by development assistance device 100. The processing shown in FIG. 16 is implemented by control device 102 of development assistance device 100 executing development assistance program 110A (see FIG. 12) described above. In another aspect, a part of or the whole processing may be executed by a circuit element or another hardware.

In step S110, control device 102 determines whether or not a command to start development tool 30 has been accepted. In a case where control device 102 determines that the command to start development tool 30 has been accepted (YES in step S110), control device 102 switches control to step S120. If not (NO in step S110), control device 102 executes the processing in step S110 again.

In step S120, control device 102 determines whether or not operation for opening design screen 31 (see FIG. 3) described above has been accepted. This operation is performed on operation unit 115 (see FIG. 12). In a case where control device 102 determines that the operation for opening design screen 31 has been accepted (YES in step S120), control device 102 switches the control to step S122. If not (NO in step S120), control device 102 switches the control to step S130.

In step S122, control device 102 displays design screen 31 on display unit 121 (see FIG. 12) of development assistance device 100. Thus, the designer can write user program 210 on design screen 31.

In step S130, control device 102 determines whether or not operation for opening publishing setting screen 33 (see FIG. 4) described above has been accepted. This operation is performed on operation unit 115. In a case where control device 102 determines that the operation for opening publishing setting screen 33 has been accepted (YES in step S130), control device 102 switches the control to step S132. If not (NO in step S130), control device 102 switches the control to step S140.

In step S132, control device 102 displays publishing setting screen 33 on display unit 121 of development assistance device 100. Thus, the designer can perform publishing settings of variables for each namespace specified in user program 210. Information set on publishing setting screen 33 is stored as publishing setting information 212 (see FIG. 5) described above.

In step S140, control device 102 determines whether or not compiling operation has been performed on user program 210. This operation is performed on operation unit 115. In a case where control device 102 determines that the compiling operation has been performed on user program 210 (YES in step S140), control device 102 switches the control to step S142. If not (NO in step S140), control device 102 switches the control to step S150.

In step S142, control device 102 executes compiling processing of user program 210. Thus, an executable file of user program 210 is generated.

In step S150, control device 102 determines whether or not operation for downloading user program 210 to controller 200 has been accepted. This operation is performed on operation unit 115. In a case where control device 102 determines that the operation for downloading user program 210 to controller 200 has been accepted (YES in step S150), control device 102 switches the control to step S152. If not (NO in step S150), control device 102 switches the control to step S160.

In step S152, control device 102 transfers a compilation result of user program 210 generated in step S142 and publishing setting information 212 generated in step S132 to specified controller 200.

In step S160, control device 102 determines whether or not operation for terminating development tool 30 has been accepted. In a case where control device 102 determines that the operation for terminating development tool 30 has been accepted (YES in step S160), control device 102 terminates the processing shown in FIG. 16. If not (NO in step S160), control device 102 returns the control to step S120.

J. Control Flow of Controller 200

Figure 17:
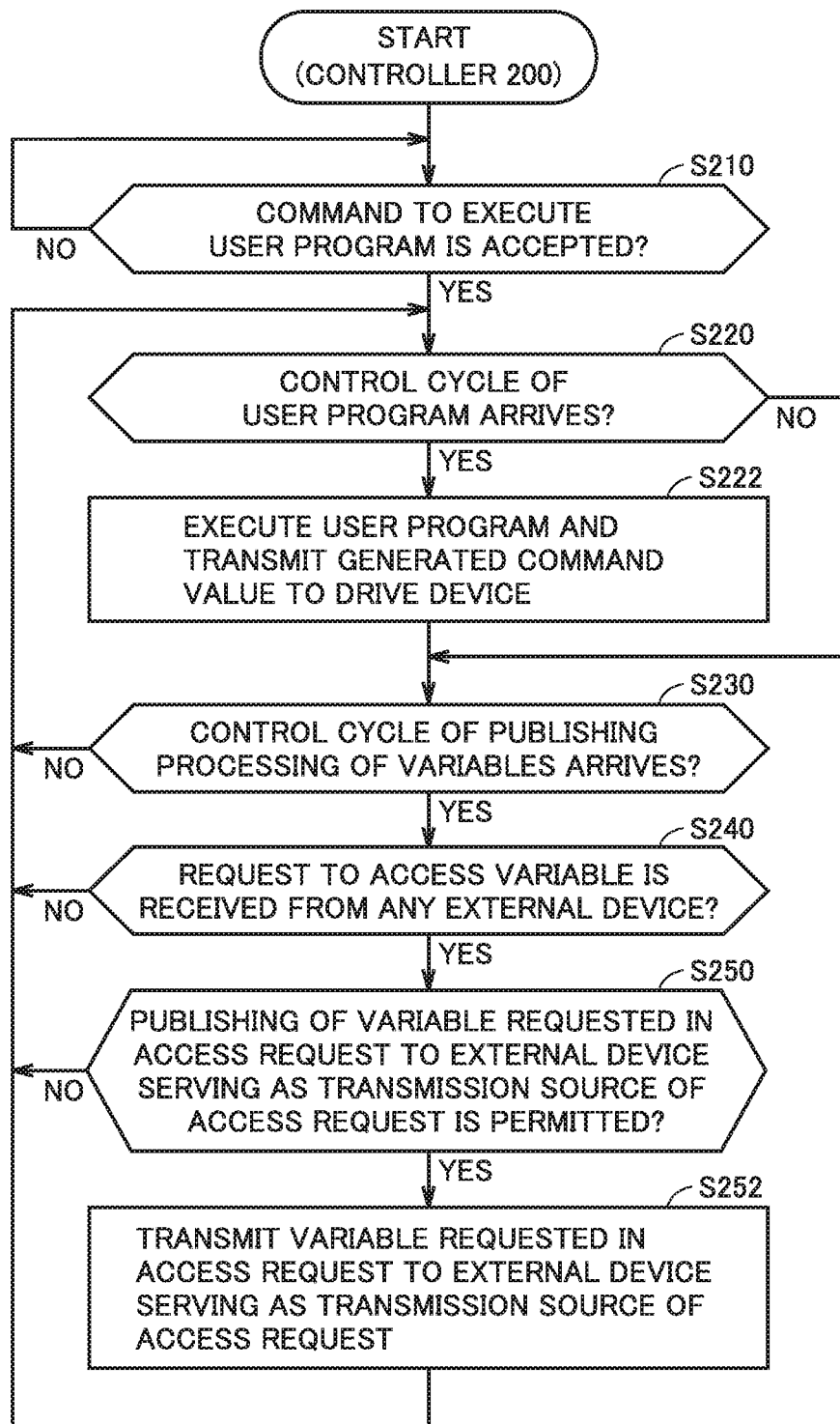
FIG. 17 is a flowchart showing a part of processing executed by a controller according to an embodiment.

Referring to FIG. 17, a control structure of controller 200 will be described. FIG. 17 is a flowchart showing a part of processing executed by controller 200. The processing shown in FIG. 17 is implemented by control device 202 of controller 200 executing a program. In another aspect, a part of or the whole processing may be executed by a circuit element or another hardware.

In step S210, control device 202 determines whether or not a command to execute user program 210 has been accepted. In a case where control device 202 determines that the command to execute user program 210 has been accepted (YES in step S210), control device 202 switches control to step S220. If not (NO in step S210), control device 202 executes the processing in step S210 again.

In step S220, control device 202 determines whether or not the control cycle of user program 210 has arrived. As described above, because user program 210 is a cyclic executive program, control device 202 repeatedly executes a command group included in user program 210 at every predetermined control cycle. In a case where control device 202 determines that the control cycle of user program 210 has arrived (YES in step S220), control device 202 switches the control to step S222. If not (NO in step S220), control device 202 switches the control to step S230.

In step S222, control device 202 executes the first to last lines of user program 210 in one control cycle. In the next control cycle, controller 200 executes the first to last lines of user program 210 again. Controller 200 outputs a command value to drive device 300 at the each control cycle.

In step S230, control device 202 determines whether or not the control cycle of publishing processing of variables has arrived. Because a delay of processing and a delay of communication are not allowed in the FA system, an execution period of the publishing processing of the variables is allocated in advance. This execution period arrives at each predetermined control cycle. In a case where control device 202 determines that the control cycle of the publishing processing of the variables has arrived (YES in step S230), control device 202 switches the control to step S240. If not (NO in step S230), control device 202 returns the control to step S220.

In step S240, control device 202 determines whether or not a request to access variables has been received from any external device 400. In a case where control device 202 determines that the request to access variables has been received from any external device 400 (YES in step S240), control device 202 switches the control to step S250. If not (NO in step S240), control device 202 returns the control to step S220.

In step S250, control device 202 determines whether or not publishing of the variables requested in the access request to external device 400 serving as a transmission source of the access request is permitted. A method of the determination has been described above, and thus description thereof will not be repeated. In a case where control device 202 determines that publishing of the variables requested in the access request to external device 400 serving as the transmission source of the access request is permitted (YES in step S250), control device 202 switches the control to step S252. If not (NO in step S250), control device 202 returns the control to step S220.

In step S252, control device 202 transmits the variables requested in the access request to external device 400 serving as the transmission source of the access request.

K. Conclusion

As described above, development assistance device 100 is configured to accept, for each namespace and each variable defined in user program 210, a publishing setting for determining whether to publish variables belonging to each namespace. The set publishing setting is transmitted to controller 200. Controller 200 publishes the variables belonging to the namespace whose setting indicates "publish" to external device 400.

Thus, the designer can perform publishing settings of variables to external device 400 for each namespace. That is, the designer does not need to individually set each variable as a public variable. As a result, the publishing setting of the variable to external device 400 becomes easier.

L. Supplementary Note

As described above, this embodiment includes the following disclosure.

[Configuration 1]
1. A control system, including:
a development assistance device (100); and
a controller (200) configured to communicate with the development assistance device (100), wherein:
a development tool (30) configured to develop a user program (210) for controlling the controller (200) is installable in the development assistance device (100), the user program (210) including at least one variable belonging to a predetermined namespace, and the development tool (30) is configured to accept, for the namespace, a publishing setting for determining whether to publish the variable belonging to the namespace to an external device (400) that is communicatively connected to the controller (200); and
the controller (200) includes
a program execution unit (252) configured to control a drive device (300) to be controlled in accordance with the user program (210) received from the development assistance device (100), and update the variable belonging to the namespace in accordance with an execution result of the user program (210), and
a publishing setting unit (250) configured to publish the variable belonging to the namespace to the external device (400) in a case where the publishing setting received from the development assistance device (100) indicates "publish".

[Configuration 2]
The control system according to the configuration 1, in which
the development tool (30)
is configured to set the publishing setting for each variable belonging to the namespace, and
reflects the publishing setting for the namespace as an initial value in the publishing setting for the variable.

[Configuration 3]
The control system according to the configuration 2, in which
the publishing setting unit (250) determines whether to publish the variable belonging to the namespace to the external device (400) by prioritizing the publishing setting for the variable over the publishing setting for the namespace.

[Configuration 4]
The control system according to any one of the configurations 1 to 3, in which:
the publishing setting further includes a communication setting indicating a communication protocol; and
the publishing setting unit (250) publishes the variable belonging to the namespace to the external device (400) in a case where the controller (200) and the external device (400) communicate with each other by using the communication protocol indicated by the communication setting.

[Configuration 5]
The control system according to any one of the configurations 1 to 4, in which:
the development assistance device (100) further includes
a volatile storage device (104), and
a nonvolatile storage device (110);
the publishing setting includes a holding setting indicating whether to hold the variable belonging to the namespace; and
the publishing setting unit (250)
stores the variable belonging to the namespace in the nonvolatile storage device (110) in a case where the holding setting indicates "hold", and
stores the variable belonging to the namespace in the volatile storage device (104) in a case where the holding setting indicates "not hold".

[Configuration 6]
A development assistance device configured to communicate with a controller (200) configured to control a drive device (300) to be controlled in response to a control command specified in a user program (210), the development assistance device including:
a communication interface (111) configured to communicate with the controller (200); and
a storage device configured to store a development program for providing a development tool (30) configured to develop the user program (210), in which:
the user program (210) includes at least one variable belonging to a predetermined namespace, and the development tool (30) is configured to accept, for the namespace, a publishing setting for causing the controller (200) to determine whether to publish the variable belonging to the namespace to an external device (400) that is communicatively connected to the controller (200); and
the communication interface (111) transfers the user program (210) and the publishing setting to the controller (200) on the basis of acceptance of transfer operation of the user program (210) by the development tool.

[Configuration 7]

A development assistance program executed by a development assistance device (100) configured to communicate with a controller (200) configured to control a drive device (300) to be controlled in response to a control command specified in a user program (210), the development assistance program causing the development assistance device (100) to execute starting a development tool (30) configured to develop the user program (210), the user program (210) including at least one variable belonging to a predetermined namespace, in which:

the development assistance program causes to the development assistance device (100) to further execute accepting, for the namespace, a publishing setting for causing the controller (200) to determine whether to publish the variable belonging to the namespace to an external device (400) that is communicatively connected to the controller (200) (S14), and transferring the user program (210) and the publishing setting to the controller (200) on the basis of acceptance of transfer operation of the user program (210) by the development tool (S20).

The embodiment disclosed this time should be considered to be given by way of illustration in all respects, not by way of limitation. The scope of the present invention is defined by claims, not by the description above, and is intended to encompass all modifications and variations within the meaning and range equivalent to the scope of claims.

REFERENCE SIGNS LIST

1: control system, 30: development tool, 31: design screen, 33, 33A, 33B: publishing setting screen, 35: search screen, 41: display field, 50, 50A, 51, 53, 56, 61A, 61B, 63A, 63B: setting field, 58: save button, 59: cancel button, 71, 72, 73: input unit, 74: display area, 100: development assistance device, 102, 202, 402: control device, 104, 206, 404: main memory, 110, 208, 410: storage device, 110A: development assistance program, 111, 201, 412: communication interface, 114, 414: I/O interface, 115: operation unit, 120: display interface, 121, 420: display unit, 125, 425: internal bus, 200: controller, 204: chipset, 209: system program, 210: user program, 210A: sequence program, 210B: motion program, 211: control program, 212, 212A: publishing setting information, 222: internal bus controller, 224: field bus controller, 226: I/O unit, 230: resource manager, 232: event management unit, 235: tool interface, 236: nonvolatile memory, 239: memory card interface, 240: memory card, 250: publishing setting unit, 252: program execution unit, 260: OPC-UA server, 261, 271: communication stack, 263, 273: main program, 270: EIP server, 300: drive device, 300A: robot controller, 300B: servo driver, 301A: arm robot, 301B: servomotor, 400, 400A, 400B: external device, 416: field bus interface, 422: display, 424: touchscreen, 440: variable monitoring screen, 450A: OPC-UA client, 450B: EIP client.

The invention claimed is:

1. A control system, comprising:
a development assistance device; and
a controller configured to communicate with the development assistance device, wherein:
a development tool configured to develop a user program for controlling the controller is installable in the development assistance device, the user program including at least one variable belonging to a predetermined namespace, and the development tool is configured to accept a first publishing setting for the namespace for determining whether to publish the at least one variable belonging to the namespace to an external device that is communicatively connected to the controller; and
the controller includes
a program execution unit configured to control a drive device to be controlled in accordance with the user program received from the development assistance device, and update the at least one variable belonging to the namespace in accordance with an execution result of the user program, and
a publishing setting unit configured to publish the at least one variable belonging to the namespace to the external device in a case where the first publishing setting received from the development assistance device indicates "publish".

2. The control system according to claim 1, wherein the development tool:
is configured to set a respective second publishing setting for each variable belonging to the namespace with the first publishing setting, and
reflects the first publishing setting for the namespace as an initial value in the respective second publishing setting for the at least one variable.

3. The control system according to claim 2, wherein the publishing setting unit determines whether to publish the at least one variable belonging to the namespace to the external device based on one or more of the respective second publishing settings for the at least one variable while ignoring the first publishing setting for the namespace.

4. The control system according to claim 1, wherein:
the first publishing setting further includes a communication setting indicating a communication protocol; and
the publishing setting unit publishes the at least one variable belonging to the namespace to the external device in a case where the controller and the external device communicate with each other by using the communication protocol indicated by the communication setting.

5. The control system according to claim 1, wherein:
the development assistance device further includes
a volatile storage device, and
a nonvolatile storage device;
the first publishing setting includes a holding setting indicating whether to hold the at least one variable belonging to the namespace; and
the publishing setting unit
stores the at least one variable belonging to the namespace in the nonvolatile storage device in a case where the holding setting indicates "hold", and
stores the at least one variable belonging to the namespace in the volatile storage device in a case where the holding setting indicates "not hold".

6. A development assistance device configured to communicate with a controller configured to control a drive device to be controlled in response to a control command specified in a user program, the development assistance device comprising:
a communication interface configured to communicate with the controller; and
a storage device configured to store a development program for providing a development tool configured to develop the user program, wherein:

the user program includes at least one variable belonging to a predetermined namespace, and the development tool is configured to accept a first publishing setting for the namespace for causing the controller to determine whether to publish the at least one variable belonging to the namespace to an external device that is communicatively connected to the controller; and the communication interface transfers the user program and the first publishing setting to the controller on the basis of acceptance of transfer operation of the user program by the development tool.

7. A non-transitory storage medium storing thereon a development assistance program executed by a development assistance device configured to communicate with a controller configured to control a drive device to be controlled in response to a control command specified in a user program, the development assistance program causing the development assistance device to execute an operation comprising starting a development tool configured to develop the user program, the user program including at least one variable belonging to a predetermined namespace, wherein:

the development assistance program causes to the development assistance device to execute operations further comprising accepting a first publishing setting for the namespace for causing the controller to determine whether to publish the at least one variable belonging to the namespace to an external device that is communicatively connected to the controller, and transferring the user program and the first publishing setting to the controller on the basis of acceptance of transfer operation of the user program by the development tool.

* * * * *